(12) United States Patent
Bilfeld et al.

(10) Patent No.: US 11,190,061 B2
(45) Date of Patent: Nov. 30, 2021

(54) ADHESIVE BACKED INDUCTION CHARGING DEVICE

(71) Applicant: INSTANT ENERGY LLC, Great Neck, NY (US)

(72) Inventors: Jordan Bilfeld, New York, NY (US); Jackson Weinreb, Sea Cliff, NY (US); Andy Yi, Dallas, TX (US); Brian Slavin, Long Grove, IL (US)

(73) Assignee: Instant Energy LLC, Great Neck, NY (US)

( * ) Notice: Subject to any disclaimer, the term of this patent is extended or adjusted under 35 U.S.C. 154(b) by 0 days.

(21) Appl. No.: 17/114,079

(22) Filed: Dec. 7, 2020

(65) Prior Publication Data

US 2021/0175757 A1    Jun. 10, 2021

Related U.S. Application Data

(60) Provisional application No. 62/945,520, filed on Dec. 9, 2019.

(51) Int. Cl.
| | | |
|---|---|---|
| *H02J 50/90* | (2016.01) | |
| *H02J 50/80* | (2016.01) | |
| *H02J 50/00* | (2016.01) | |
| *H02J 50/10* | (2016.01) | |

(52) U.S. Cl.
CPC ............ *H02J 50/90* (2016.02); *H02J 50/005* (2020.01); *H02J 50/10* (2016.02); *H02J 50/80* (2016.02)

(58) Field of Classification Search
CPC .. H02J 50/90; H02J 50/80; H02J 50/10; H02J 50/005
USPC ........................................................ 307/104
See application file for complete search history.

(56) References Cited

U.S. PATENT DOCUMENTS

| | | |
|---|---|---|
| 8,903,456 B2 | 12/2014 | Chu et al. |
| 9,112,364 B2 | 8/2015 | Partovi |
| 9,312,921 B2 | 4/2016 | Nambord et al. |
| 9,325,187 B2 | 4/2016 | Lee et al. |
| 9,337,902 B2 | 5/2016 | Raab et al. |
| 9,356,660 B2 | 5/2016 | Jung et al. |
| D763,188 S | 8/2016 | Park et al. |
| 9,406,913 B2 | 8/2016 | Huang et al. |

(Continued)

FOREIGN PATENT DOCUMENTS

| | | |
|---|---|---|
| CN | 202159985 U | 3/2012 |
| CN | 103378627 A | 10/2013 |

OTHER PUBLICATIONS

International Search Report dated Mar. 10, 2021 from corresponding International Patent Application No. PCT/US2020/063628, 2 pages.

(Continued)

*Primary Examiner* — Alfonso Perez Borroto
(74) *Attorney, Agent, or Firm* — Ohlandt, Greeley, Ruggiero & Perle, L.L.P.

(57) ABSTRACT

The present disclosure provides a connected, preferably adhesive, backed wireless induction charging device for charging electronic devices enabled for wireless induction charging that prevents relative motion between the electronic device and the induction charger once the electronic device has been placed onto the adhesive side of the induction charger so that the electronic device is able to maintain proper positioning for charging at an optimal rate.

20 Claims, 24 Drawing Sheets

(56) References Cited

U.S. PATENT DOCUMENTS

| | | |
|---|---|---|
| 2010/0081483 A1 | 4/2010 | Chatterjee et al. |
| 2010/0109443 A1 | 5/2010 | Cook et al. |
| 2013/0119929 A1 | 5/2013 | Partovi |
| 2013/0260677 A1 | 10/2013 | Partovi |
| 2014/0132206 A1* | 5/2014 | Zhu .................. H02J 7/025 |
| | | 320/108 |
| 2016/0013498 A1 | 1/2016 | Herring |
| 2016/0190856 A1 | 6/2016 | Baek et al. |
| 2016/0204644 A1 | 7/2016 | Dukerschein et al. |
| 2017/0133145 A1* | 5/2017 | Hong ................. H01F 27/2804 |
| 2017/0345548 A1* | 11/2017 | Yu ..................... H01F 27/2804 |
| 2018/0013312 A1* | 1/2018 | Moyer .................. H02J 7/025 |
| 2018/0090991 A1* | 3/2018 | Jol ....................... H02J 50/70 |

OTHER PUBLICATIONS

Written Opinion dated Mar. 10, 2021 from corresponding International Patent Application No. PCT/US2020/063628, 4 pages.

\* cited by examiner

ADHESIVE BACKED INDUCTION CHARGING DEVICE

CROSS REFERENCE TO RELATED APPLICATION

This application claims priority under 35 U.S.C § 119(e) from U.S. Provisional Application No. 62/945,520 filed on Dec. 9, 2019, the entire contents of which is incorporated herein by reference.

BACKGROUND OF THE DISCLOSURE

1. Field of the Disclosure

The present disclosure relates to a charging device for wirelessly charging an electronic device. More particularly, the present disclosure relates to a connectable wireless induction charging device for charging electronic devices enabled for wireless induction charging.

2. Description of the Related Art

Current practices for charging electronic devices include using wired and wireless chargers. However, wired chargers often present the problem of carrying wires, and various charging accessories along with the electronic device. Additionally, the user of the device must be able to find an appropriate power source or wall outlet for the charger.

Although wireless induction chargers are available such as wireless charging stations, and mats, these chargers also have wires that need to be plugged into a power source such as a wall outlet. Furthermore, these wireless induction charging devices require that a user place the electronic device in a particular manner so that the induction coil of the charger and the induction coil of the device sufficiently overlap and further that the distance between the coils is kept to less than a certain threshold.

If the electronic device is not placed on the charger correctly from the start, or if it is placed correctly and later inadvertently moved from the proper position, the device will not charge at all, or charge at a slower, less optimal rate than the rate that the charger is capable of. Therefore, proper placement of the induction charger and electronic device in relation to each other, and the maintenance of this positioning is vital for optimal charging.

Furthermore, users of electronic devices, such as smartphones frequently use their devices to the point that their battery is virtually drained. Thus, users have carried wired charging devices with them to prevent their electronic devices from running out of charge. This is inconvenient. Furthermore, wireless charging creates difficulties when the proper positioning of the charger and device are disturbed.

Thus, there is a need to address the foregoing problems.

SUMMARY OF THE DISCLOSURE

The present disclosure provides a portable induction charging device that addresses at least the aforementioned shortcomings of current methods and devices for wirelessly charging electronic devices.

The present disclosure also provides an induction charging device that is pre-charged, and in some embodiments disposable.

The present disclosure further provides such an induction charging device that prevents, or virtually prevents, relative movement between the electronic device and induction charger by an adhesive on the charging side of the induction charger.

The present disclosure still further provides such an induction charging device in which adhesive contacts the electronic device on its charging side and prevents relative movement between the charger and device, once the charger and device have been placed into contact with each other.

The present disclosure yet further provides for embodiments that allow recharging of the battery of the induction charging device. Embodiments of the induction charging device disclosed herein, include a pre-charged, slim, lightweight, portable induction charging device with an adhesive provided on the charging side of the device. Certain embodiments of the induction charging device use the Qi standard for charging electronic devices that are Qi standard ready or enabled.

DESCRIPTION OF EXEMPLARY EMBODIMENTS

The present disclosure provides a portable, slim, induction charging device that is pre-charged and disposable. The induction charging device prevents, or virtually prevents, relative movement between the electronic device and induction charger by the use of an adhesive on the charging side of the induction charger.

Figure 1:
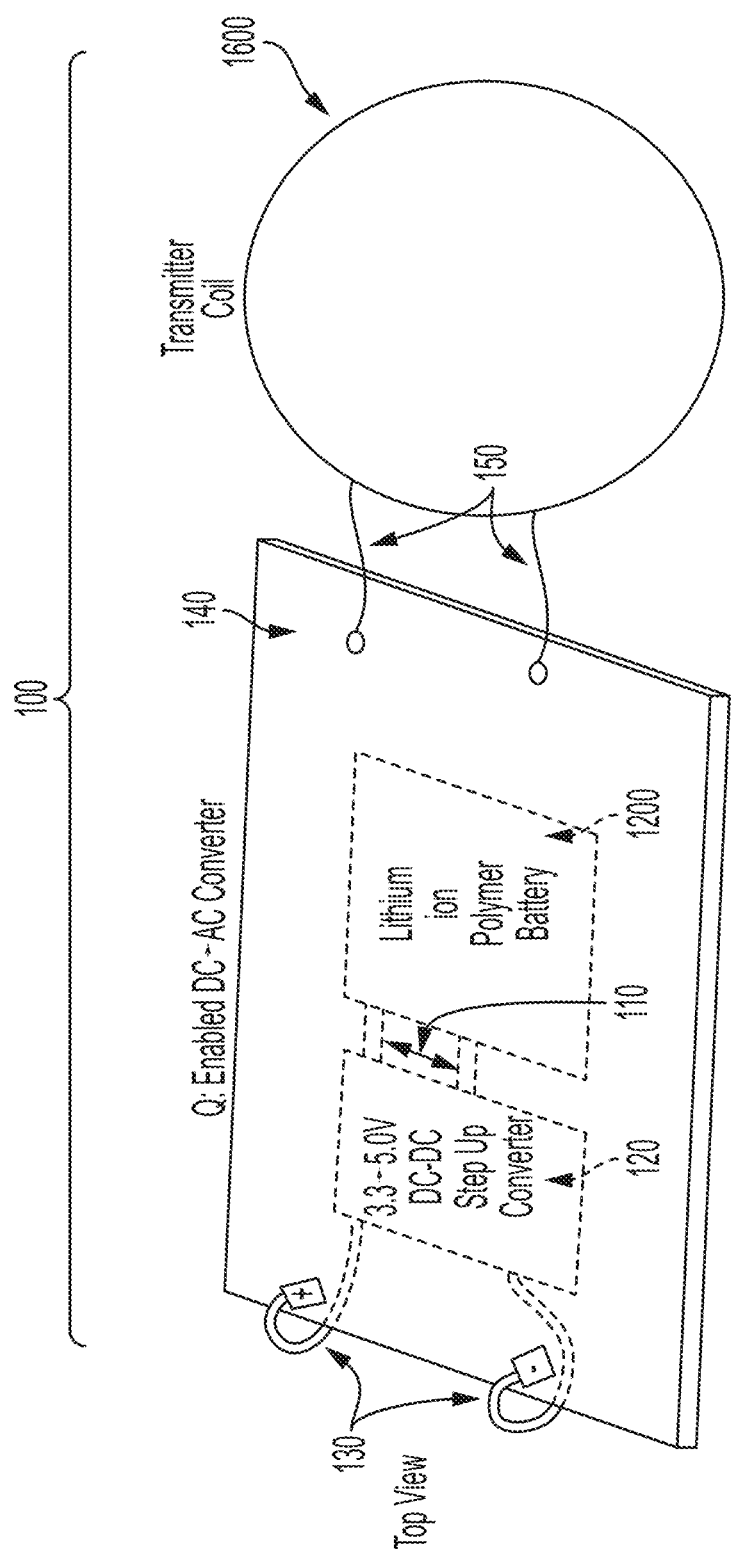
FIG. 1 is a top perspective view of an embodiment illustrating certain internal components of the charging device.

Referring to the drawings and in particular, to FIG. 1, an embodiment of the charging or induction charging device generally represented by reference numeral 100. The charging device 100 has a casing assembly 200 shown in FIG. 11. The charging device 100 has certain internal components, such as battery 1200, DC to DC step up convertor 120 and DC to AC converter 140 shown in the embodiment of FIG. 1.

Figure 12:
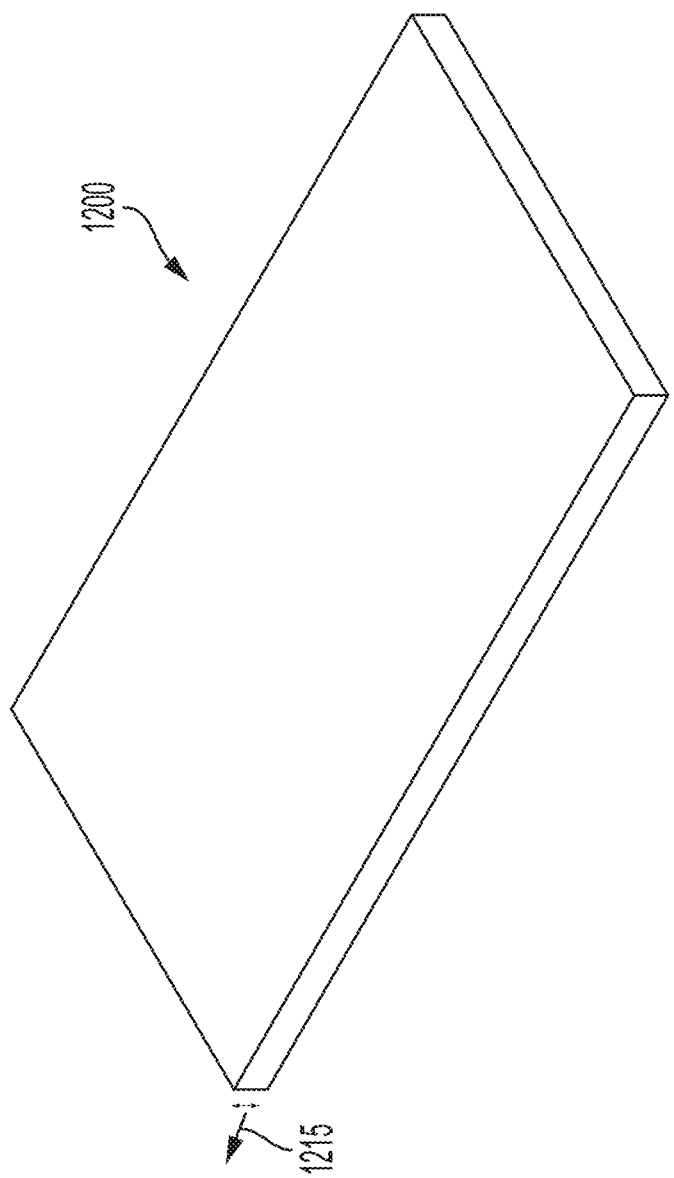
FIG. 12 is a top perspective view of an embodiment of a battery used in the charging device.

Battery 1200 is a Direct Current (DC) power source. Battery 1200 provides power to the induction charging device. Another embodiment of battery 1200 is shown in FIG. 12.

In some embodiments, battery 1200 is a lithium-ion battery or a lithium ion polymer battery. Battery 1200 can be a single battery, or multiple batteries connected in a series. Battery 1200 can be connected to a toggle switch that indicates "on" and "off" modes. The positive and negative terminals of battery 1200 are connected to a DC to DC step up convertor 120, by connection 110. In some embodiments battery 1200 is a lithium ion polymer battery, with a capacity of 2000 mAh at 3.7V. In some embodiments battery 1200 has a length of 69 millimeters (mm), a width of 37 (mm), and a thickness of 5.5 (mm). In some embodiments when battery 1200 drops below 3.0 V, charging device 100 will shut down.

DC to DC step up converter 120 steps up the voltage provided by battery 1200. In some embodiments, converter 120 receives a voltage in a range of 3.0-4.2 Volts from battery 1200, and steps up the voltage to 5.0 volts.

In some embodiments, DC to DC step up converter 120 includes a series of capacitors, inductors, diodes and resistors and power regulating circuitry to maintain output of a higher voltage in DC current than is supplied to converter 120 by battery 1200. In some embodiments, convertor 120 receives 3 Volts and steps up the voltage using a coil inductor, fixed capacitors and a series of diodes. In some embodiments, the diodes used are SS14 diode chips. In some embodiments, a switching regulator on the chip controls the circuit using a light emitting diode (LED) to indicate if the circuit is running or not.

In some embodiments, DC to DC step up converter 120 steps up voltage and reduces current and provides a higher voltage and lower direct current to converter 140. Converter 140 is a DC to alternating current (AC) converter.

In some embodiments, DC to DC converter 120 is connected to DC to AC converter 140 via positive and negative wiring at connection 130. DC to DC convertor 120 supplies 5 Volts to DC to AC convertor 140.

DC to AC convertor 140 converts DC current received from DC to DC step up convertor that is at 5 Volts to an AC current. In some embodiments, convertor 140 uses an LM324 Quadruple op amp, resistors, inductors, and a series of diodes in order to convert DC current to AC current. In some embodiments, a HB898A micro-controller regulates the amp, resistors, inductors, and diodes in order to output an AC current with a frequency of between 100 kHZ and 215 kHZ.

DC to AC convertor 140 provides alternating current to transmitter coil 1600 via positive and negative wiring connections 150.

Transmitter coil 1600 is a looped wire. In some embodiments, the looped wire is made of materials such as enameled copper wire, has a diameter of 1.10 (mm), and has 11 number of turns or loops. In some embodiments, coil 1600 rests on or is attached to a circular ferromagnetic material. The ferro magnet increases the magnetic field intensity and facilitates the electromagnetic field. Furthermore, the ferro magnet also serves as a magnetic insulator that prevents and/or decreases interference to the rest of the PCB 1400.

The coil 1600 is coiled in loops from one end of wiring connection 150, starting near the center of the circular ferromagnetic material. Each turn or loop of the coil extends the coil towards the outer edge of the circular ferromagnetic material, at which point the coil ends at the other end of wiring connection 150. In some embodiments, the ferromagnetic material has a center hole. Certain embodiments of coil 1600 are described in FIG. 16 to FIG. 19 below.

Transmitter coil 1600 receives alternating current from convertor 140, so that the alternating current produces an alternating or varying magnetic field about the wiring of coil 1600. When an electronic device with a receiver coil is placed in a certain proximity to the coil 1600 of the charging device 100, the alternating magnetic field of the coil 1600 induces a current in the wiring of the receiver coil of the electronic device, through induction. In some embodiments, the coil 1600 has a charging range of 2 millimeters (mm) to 8 millimeters, so that the receiving coil of the electronic device must be placed in this range. In a preferred embodiment, the charging range is at or about 3 (mm). The current produced in the receiver coil of the electronic device by the inductive charger is then used to charge and/or power the electronic device. In some embodiments, the induction charging device 100 can charge an electronic device's battery, that has a 2700 mAh capacity, 6-7% for every 10 minutes of charging time. In some embodiments, the induction charging device 100 can charge the electronic device's battery from 50% to 100%. In some embodiments, the 2000 mAh battery 1200, is capable of charging a battery with a 2716 mAh capacity from 0% charge to 35-40% charge in a time frame of 1 hour or about 1 hour.

Figure 2:
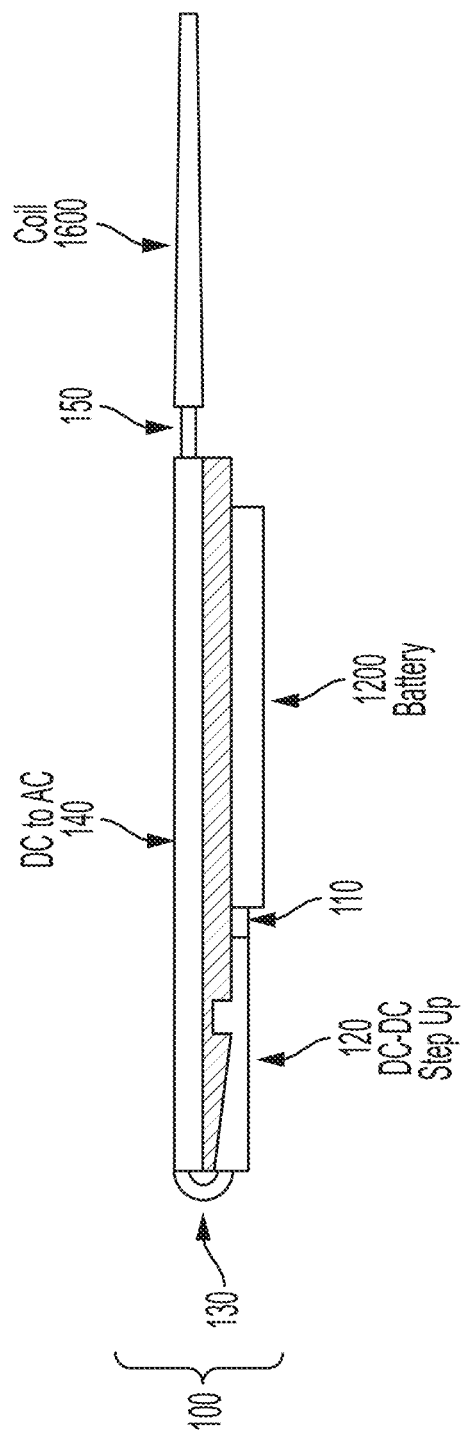
FIG. 2 is a side view of the embodiment of FIG. 1 that illustrates certain internal components of the charging device.

FIG. 2 is a side view of the internal components of the induction charging device shown in FIG. 1 and described above.

Figure 3:
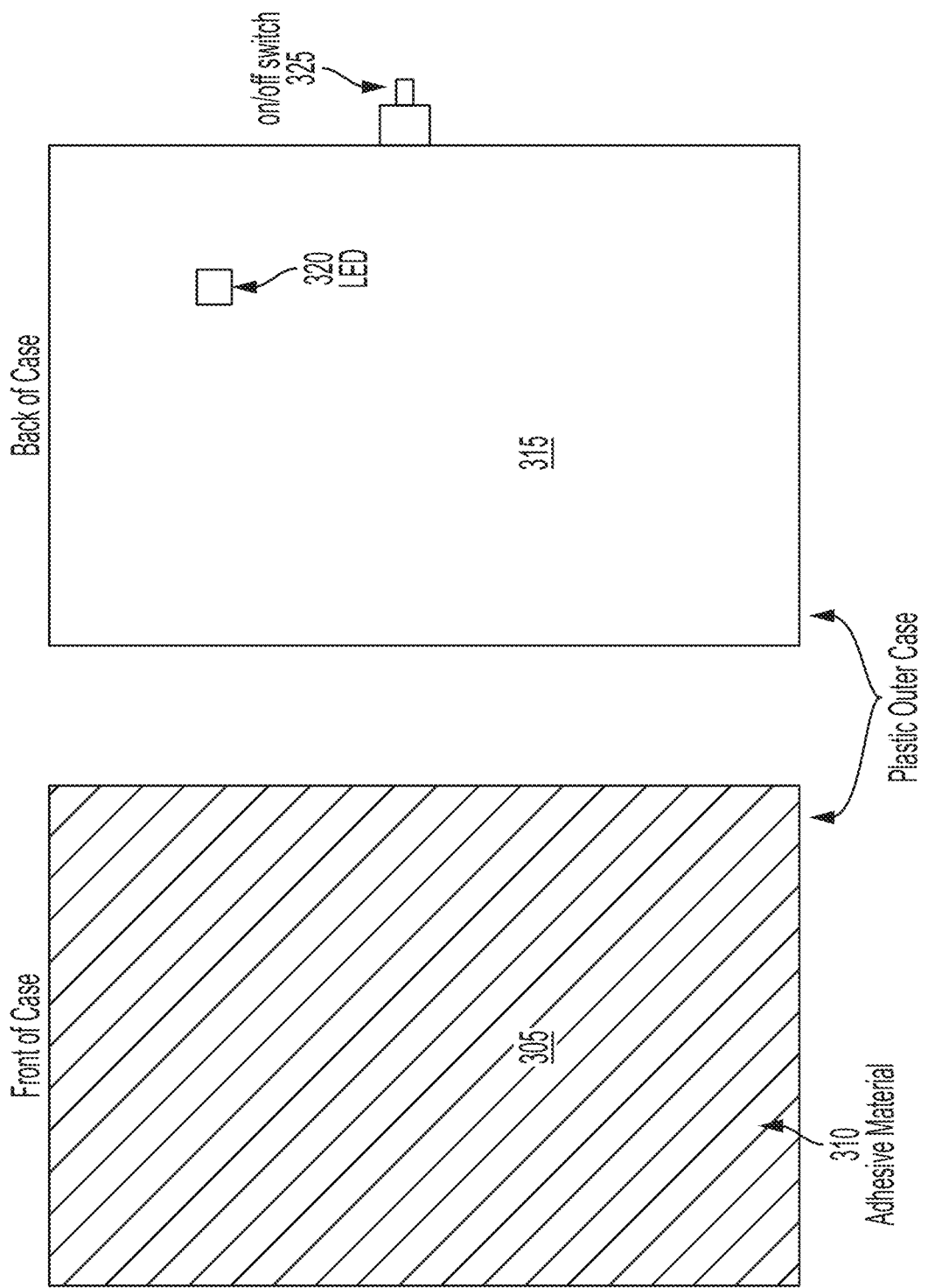
FIG. 3 is an external front view and external back view of an embodiment of a case for the charging device.

Referring to FIG. 3, the charging case of the charging device 100 has an external front 305 and external back 315. Front side 305 has an adhesive material 310 that adheres to the charging side of the electronic device and forms an adhesive layer or surface thereon. Adhesive material 310 preferably prevents or at least reduces relative motion between the electronic device and the charging device 100 once the electronic device is placed on the adhesive layer. In some embodiments, the adhesive material 310 is a double-sided micro-suction tape that is applied on the coil side of the outer portion of the charging case. In some embodiments the first side of the double sided tape has a permanent adhesive to apply to the external portion of the casing, while the second side of the double-sided tape has a non-permanent adhesive to prevent relative motion between the charging device 100 and the electronic device to be charged, while allowing the electronic device to be removed and redeposited on the adhesive multiple times without significant effort by a user, with the double-sided tape retaining its adhesive properties. The adhesive material 310 is used on areas of casing 705 and 710 of casing 700, as described in FIG. 7 below. In some embodiments the adhesive material 310 is covered with a non-stick material to protect the adhesive material prior to first use.

In some embodiments, back side 315 and front side 305 of made of a plastic or polymeric material. In some embodiments, the charging case is made from materials such as polycarbonate. In some embodiments, the charging case is made from a thermoplastic. In some embodiments, the charging case is made of the same material such as a thermoplastic, throughout the entire case. In some embodiments, back side 315 has an LED 320 for displaying various status indicators. The status indicators provide information based on whether the LED is on or off, or based on the color of the LED light. The status indicators provide information, such as charging status, on or off status, and the amount of battery left. The status indicators can be placed on various locations on the case of the charging device 100.

In some embodiments, charging device 100 has a switch 325. Switch 325 can turn the charging device 100 on or off. Switch 325 can be located on a side adjacent to side 305 or side 315.

Figure 4:
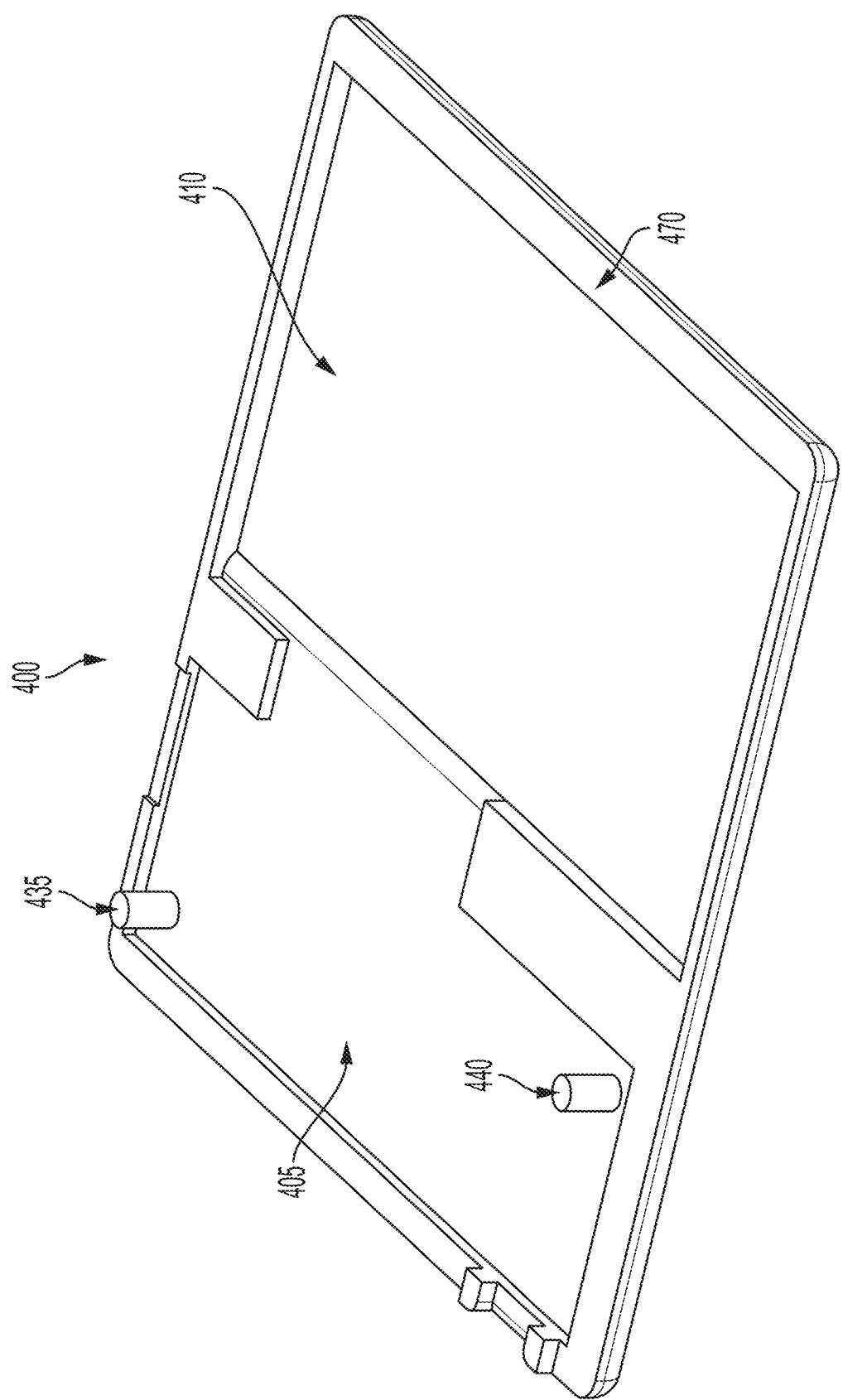
FIG. 4 is a top perspective view of a first embodiment of an inner portion of a casing for the charging device.

FIG. 4 shows the bottom half casing 400 of casing assembly 200.

Figure 5:
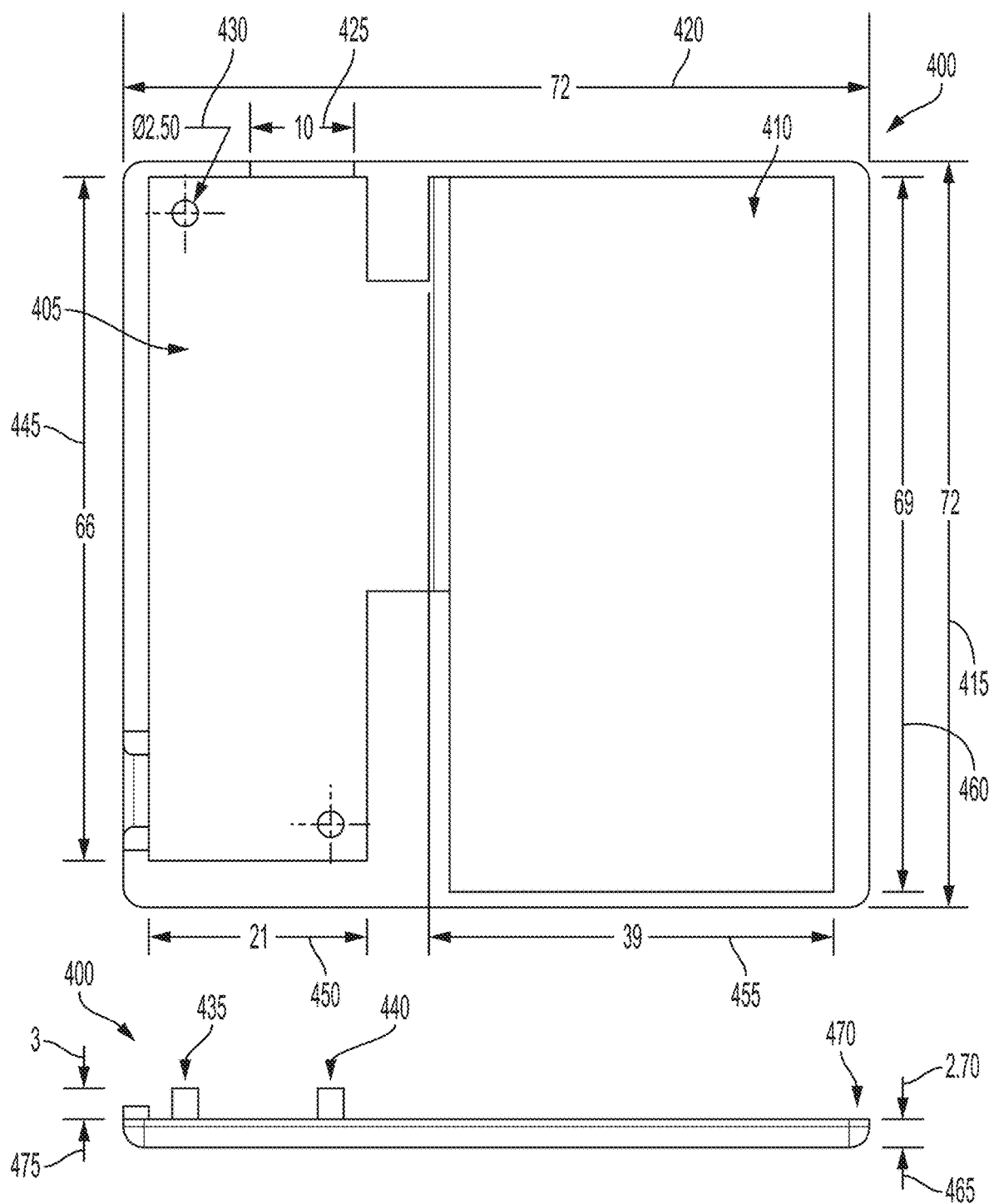
FIG. 5 is a top view of the inner portion of the casing, and a side view of the same casing for the charging device shown in FIG. 4.
Figure 6:
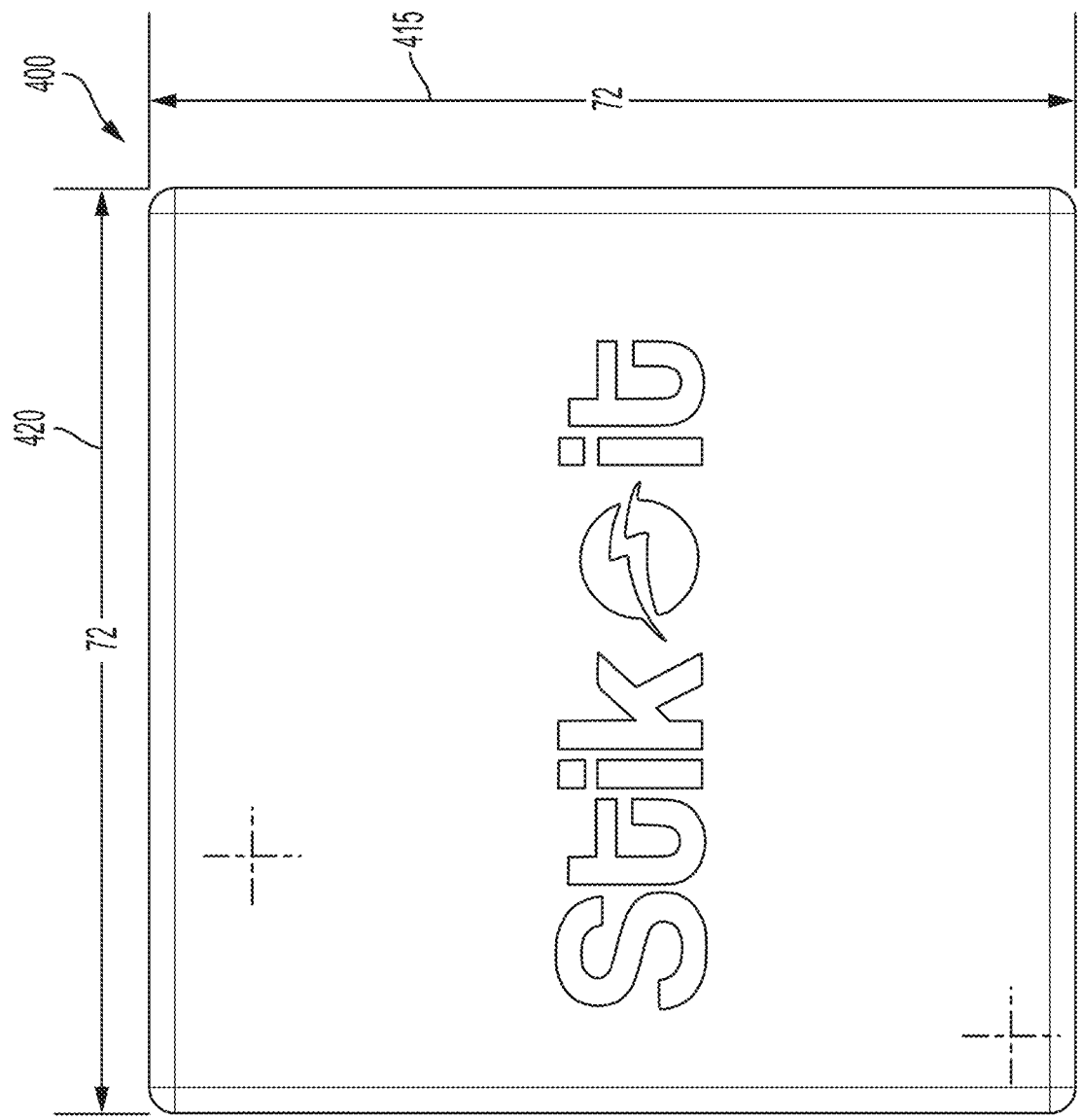
FIG. 6 is a top view of an outer portion of the casing for the charging device shown in FIG. 4.

FIGS. 4 to 6 show an embodiment of a first bottom portion 400 of casing assembly 200 for the charger 100 in which casing 400 does not have an adhesive applied to the exterior portion of the casing. FIGS. 4 to 11 show a first embodiment of the casing for the induction charging device 100 of the present disclosure.

Casing 400 has a portion 410 that houses battery 1200, shown in FIGS. 1, 2 and 12. Portion 405 of casing 400 is a portion that houses printed circuit board (PCB) 1400. In some embodiments, PCB 1400 is connected to battery 1200, and includes both a DC to DC step up convertor 120, and a DC to AC converter 140 as described above. In some embodiments, PCB 1400 is connected to a transmitter coil 1600. PCB 1400 will be further described below with respect to FIG. 14. In some embodiments, cylindrical protrusions 435 and 440 are used to secure PCB 1400.

FIG. 5 is a top view of the inner portion of the casing 400 for the charging device and shows the physical dimensions of components and positions of same therein.

Measurement 415 is the length of the outer portion of casing 400. In some embodiments, measurement 415 is 72 millimeters (mm). Measurement 420 is the width of the outer portion of casing 400. In some embodiments, measurement 420 is 72 millimeters (mm). Measurement 425 is the length of an opening in the side of casing 400 through which a Universal Serial Bus (USB) port is housed. In some embodiments, measurement 425 is 10 (mm). Measurement 430 is the diameter of cylindrical protrusions 435 and 440. In some embodiments, measurement 430 is 2.5 (mm). Measurement 445 is the length of housing for PCB 1400. In some embodiments, measurement 445 is 66 (mm). Measurement 450 is the width of the housing for PCB 1400. In some embodiments measurements 450 is 21 (mm). Measurement 455 is a width of a portion of the housing for battery 1200. In some embodiments, measurements 455 is 39 (mm).

Measurement 460 is the length of housing for battery 1200. In some embodiments, measurement 460 is 69 (mm).

Measurement 465 is the thickness of casing 400 measured from a lip portion 470 to the outer portion of the casing. In some embodiments, measurement 465 is 2.7 (mm). Measurement 475 is a measurement of the height of cylindrical protrusions 435 and 440, as measured from lip 470. In some embodiments, measurement 475 is 3 (mm).

FIG. 6 is the top view of the embodiment of the outer portion of the casing 400, showing the length and width 415 and 420 as described above in FIG. 5.

Figure 7:
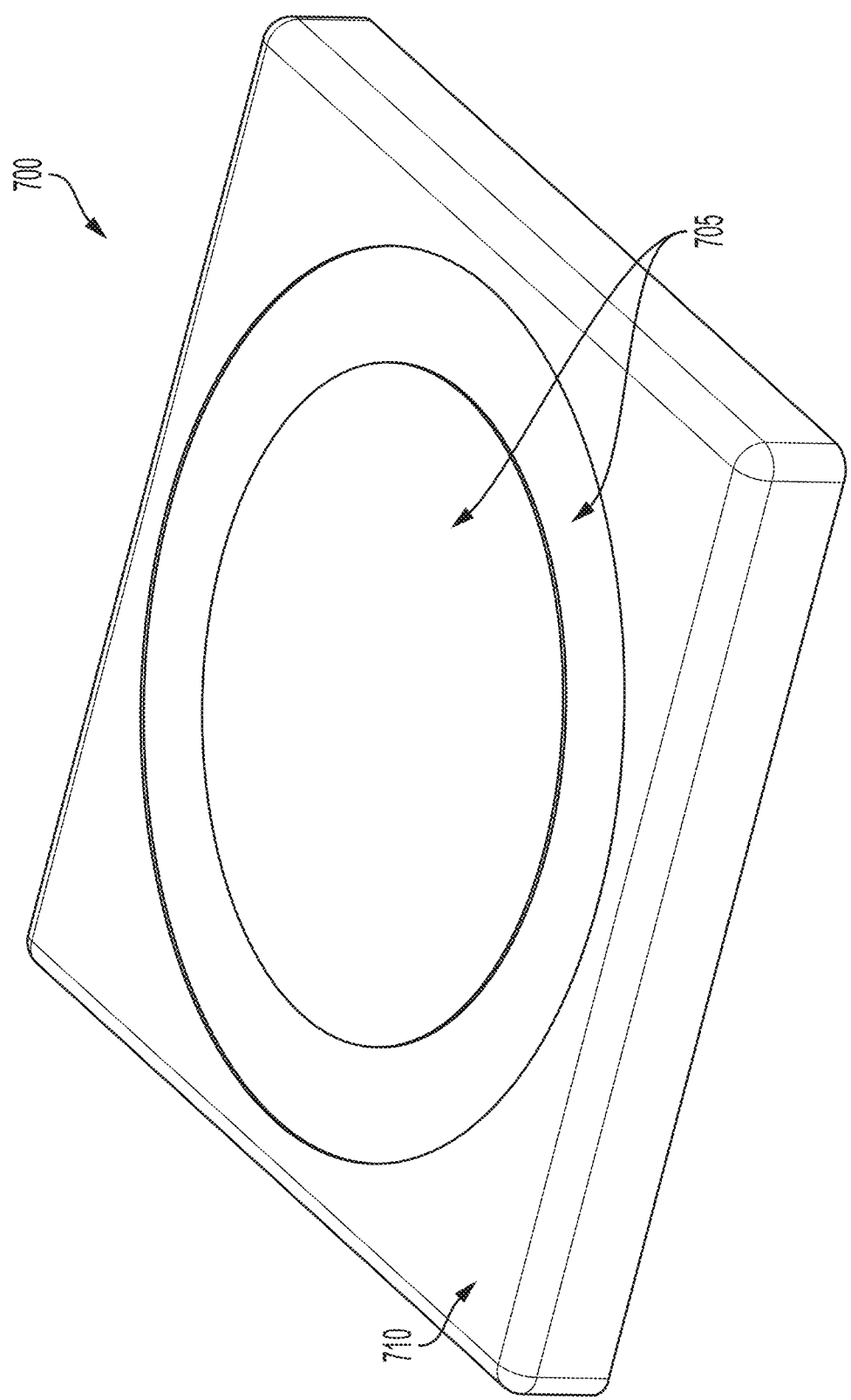
FIG. 7 is a top perspective view of an embodiment of an outer portion of a casing for the charging device of FIG. 4.

In the embodiment of FIG. 7, the top half 700 of the casing assembly 200 is shown from an exterior view. Portion 705 of the casing 700 is a portion that covers transmitter coil 1600 that will be further described with respect to FIG. 16. Portion 705 is an area of the casing 200 on the top half portion 700 that has an adhesive as described in FIG. 3 above. Portions 710 of casing 700 can also have that adhesive.

Figure 9:
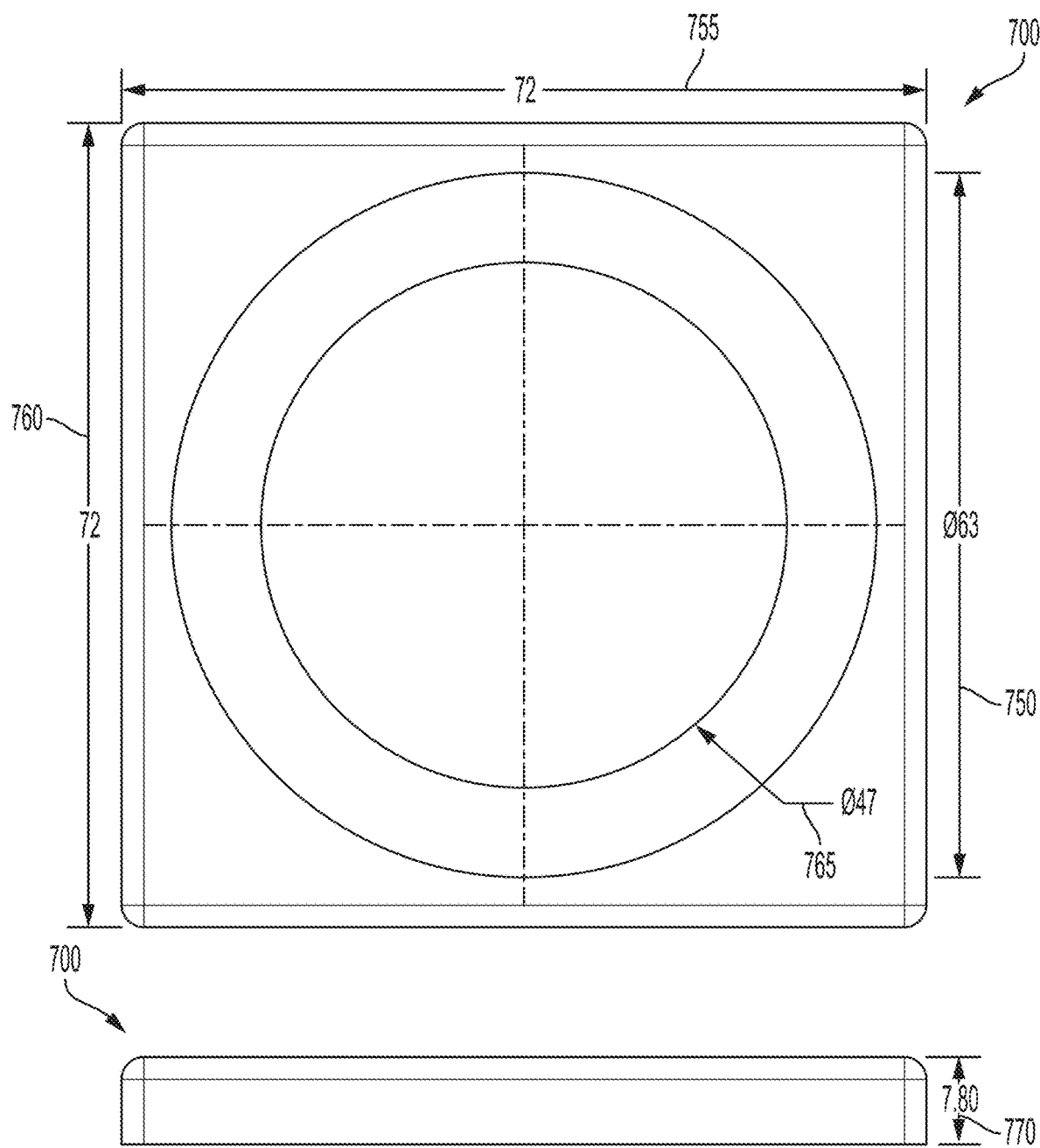
FIG. 9 is a top view of the outer portion of the casing and a side view of the same casing of the charging device shown in FIG. 7.

Referring to both FIGS. 7 and 9, portion 705 is composed of two concentric circles, with the larger circle having a larger diameter 750 and the smaller circle having a smaller diameter 765. In some embodiments the adhesive material 310 is only applied to the circular outline or perimeter area 705 defined by the larger circular area, and not applied to the inner circular area 705 defined by the inner smaller circle, with the adhesive area covering 1,382 ($mm^2$). In some embodiments the circular perimeter area 705 has the adhesive area covering between 1,250 ($mm^2$) to 1,450 ($mm^2$).

Casing 700 is on the coil side of the charging device and is the side of the charging device that is in contact with a user's electronic device. In some embodiments, the optimal area for charging a user's device is directly above the coil housing 705 on the top portion of casing 700.

Figure 8:
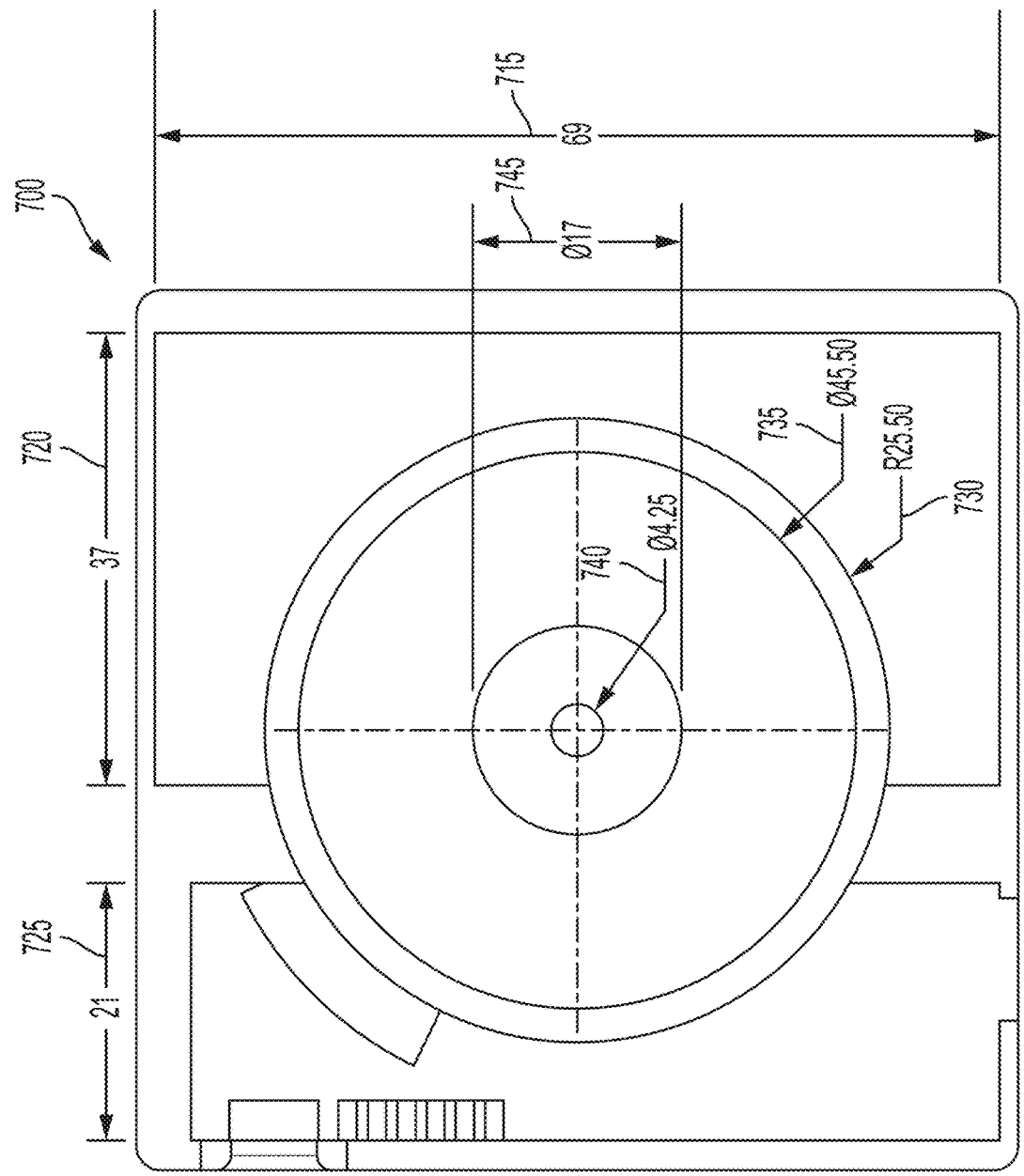
FIG. 8 is a top view of the inner portion of the casing for the charging device shown in FIG. 7.

Referring to FIG. 8, measurement 715 is the measurement for the length of the battery 1200 housing in the inner portion of casing 700. In some embodiments, measurement 715 is 69 (mm). Measurement 720 is the width of the housing of the battery 1200 in casing 700. In some embodiments, measurement 720 is 37 (mm). Measurement 725 is the width of the housing for PCB 1400 in casing 700. In some embodiments measurement 725 is 21 (mm). Measurement 730 is the outer radius of the housing for transmitter coil 1600. In some embodiments, measurement 730 is 25.50 (mm). Measurement 735 is the diameter of the housing for the coils of the transmitter coil 1600. In some embodiments, measurement 735 is 45.50 (mm). Measurement 740 is the diameter of a cylindrical protrusion on the inner portion of casing 700. In some embodiments, measurement 740 is 4.25 (mm). Measurement 745 is the inner diameter of the housing for the coils of the transmitter coil 1600. In some embodiments, measurement 745 is 17 (mm).

Referring to FIG. 9, measurement 750 is the outer diameter of the outer casing 700 that covers the outer diameter of transmitter coil 1600. In some embodiments, measurement 750 is 63 (mm). Measurement 755 is the width of casing 700. In some embodiments, measurement 755 is 72 (mm). Measurement 760 is the length of casing 700. In some embodiments, measurement 760 is 72 (mm). Measurement 765 is the diameter of the outer casing 700 that covers the diameter of the coils of transmitter coil 1600. In some embodiments, measurement 765 is 47 (mm). Measurement 770 is the thickness of the casing 700 as shown. In some embodiments, measurement 770 is 7.8 (mm).

Figure 10:
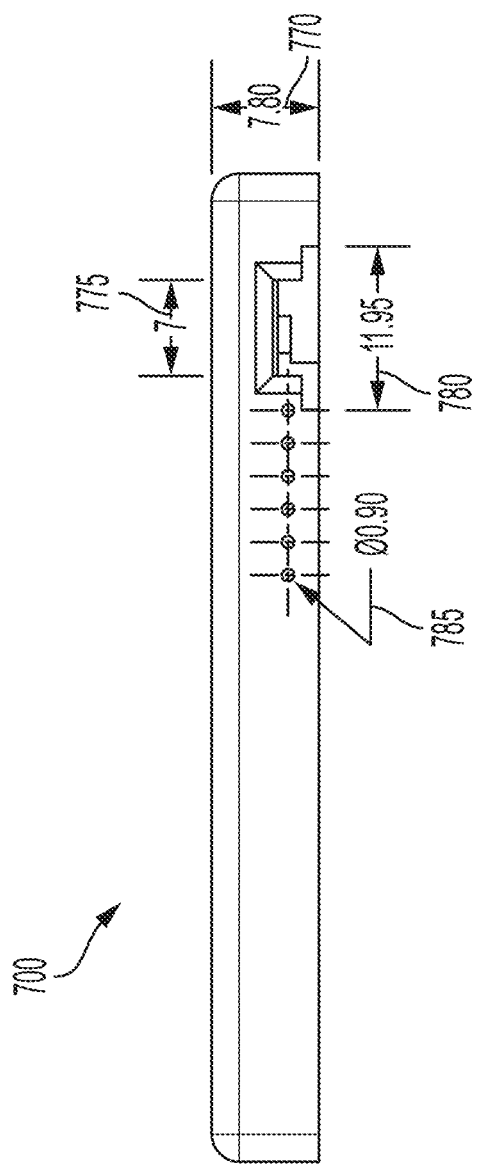
FIG. 10 is another side view of the casing for the charging device shown in FIG. 7.

Referring to FIG. 10, measurement 770 is again 7.8 (mm) for the thickness of casing 700. Measurement 775 is the width of the cutout or opening for an on/off switch 325 as described above or switch 1415 described below. In some embodiments, measurement 775 is 7 (mm). Measurement 780 is a width of an opening for an attachment to lower casing 400. In some embodiments, measurement 780 is 11.95 (mm). Measurement 785 is the diameter of each one of six LED status indicator lights 790. In some embodiments, measurement 785 is 0.9 (mm).

FIGS. 7 to 10 show an embodiment of a top portion 700 of a casing assembly 200 for the charger 100 in which the casing 700 has an adhesive applied to the exterior portion of the casing. The internal components including the PCB 1400, battery 1200, and coil 1600 are placed in the internal portions of the casing assembly 200 and connected.

Figure 11:
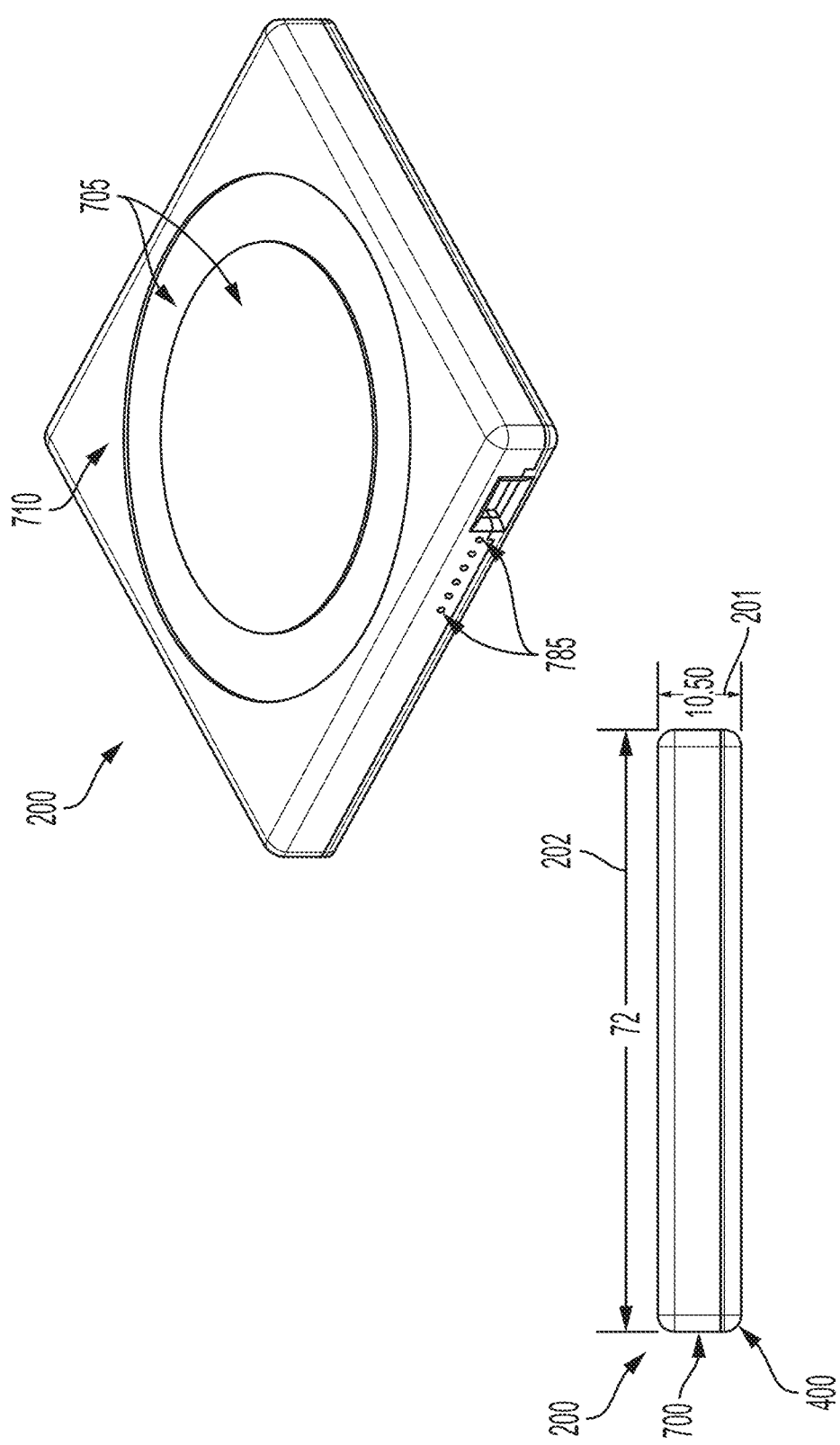
FIG. 11 is a top perspective view showing a first embodiment of the assembly of the casings of FIGS. 4 and 7, and a side view of the same assembly.

Referring to FIG. 11, the assembly of casing 400 and 700 together is shown as casing assembly 200. Measurement 201 is the thickness of assembly 200. In some embodiments, measurement 201 is 10.5 (mm). Measurement 202 is both the width and length of casing assembly 200. In some embodiments. measurement 202 is 72 (mm). The first top casing portion 700 and second bottom casing portion 400 connect to form the external casing 200 for the charging device as shown in FIG. 11. An electronic device would be placed on the top exterior portion 705 with the adhesive backing of the casing 200 in order to charge their electronic device.

FIG. 12 is an embodiment of a battery used in the charging device. Battery 1200 has a thickness 1215. In some embodiments, thickness 1215 is 5.5 (mm).

Figure 13:
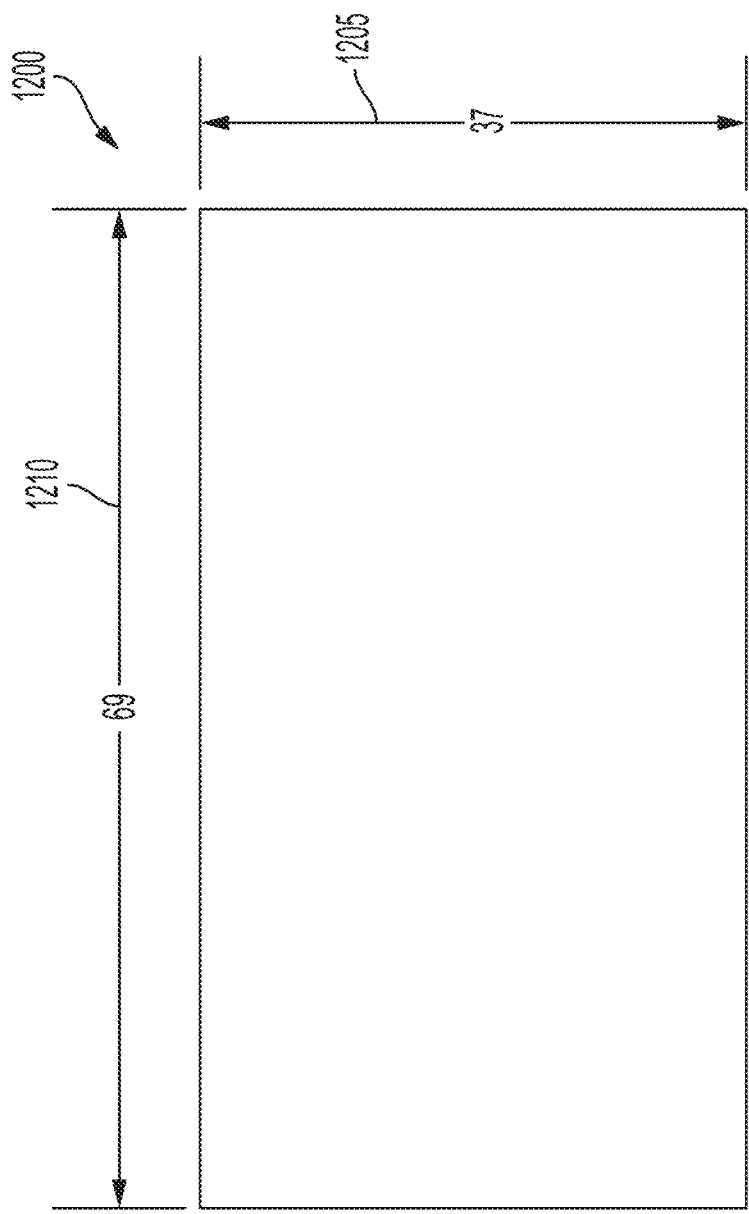
FIG. 13 is a top view of the embodiment of the battery used in the charging device shown in FIG. 12.

Referring to FIG. 13, measurement 1205 is the width of battery 1200. In some embodiments, measurement 1205 is 37 (mm). Measurement 1210 is the length of battery 1200. In some embodiments, measurement 1210 is 69 (mm).

Figure 14:
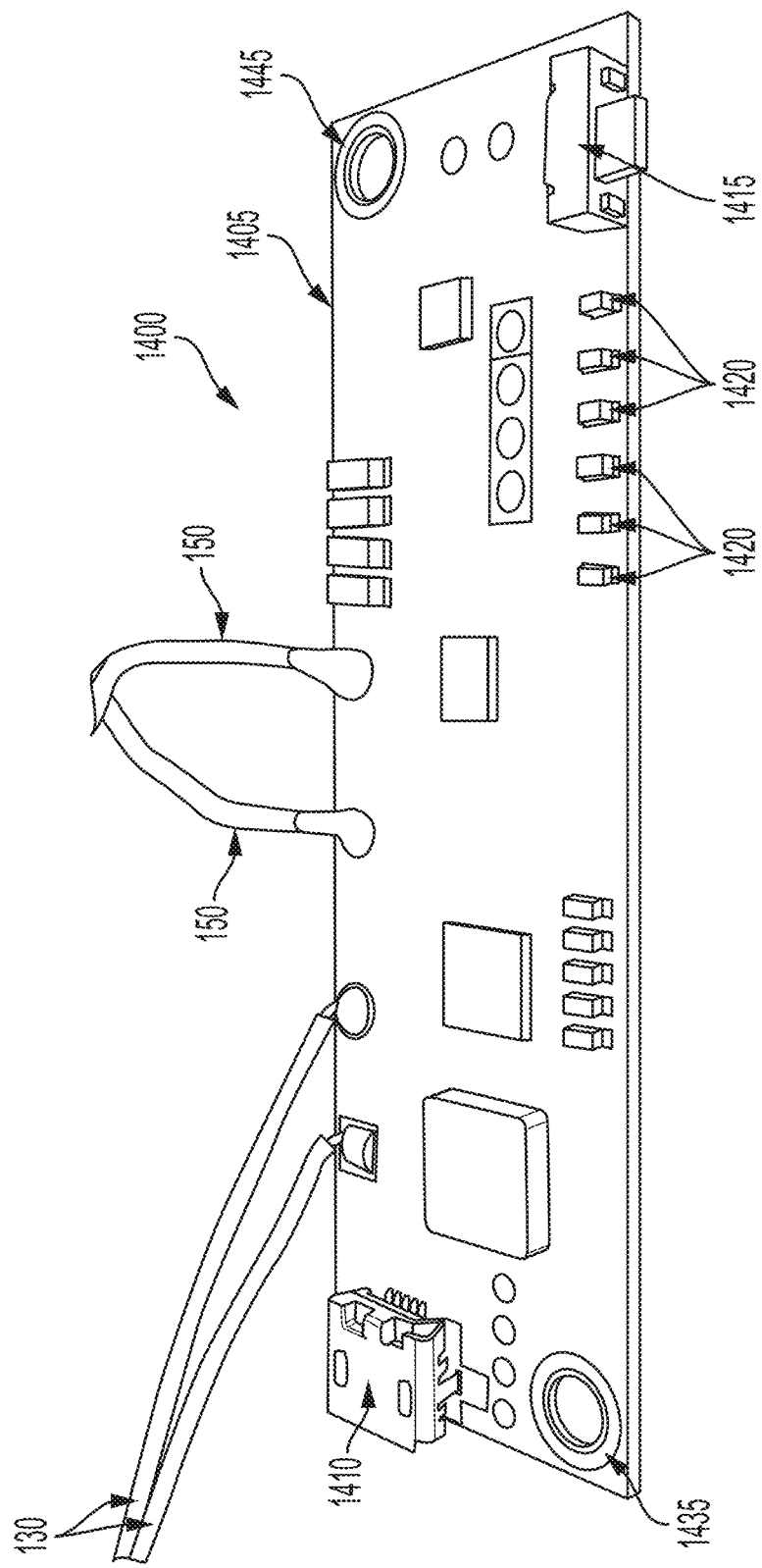
FIG. 14 is a top perspective view of an embodiment of a printed circuit board used in the charging device of FIG. 11.

FIG. 14 is an embodiment of a printed circuit board 1400 that is used in the charging device 100. PCB 1400 has an electronic circuit board 1405. Electronic circuit board 1405 includes components such as capacitors, diodes, inductors, resistors, LEDS, and power regulating circuitry configured to operate the induction charging device. PCB 1400 includes DC to DC step up converter 120 and DC to AC convertor 140. PCB 1400 has a switch 1415, for turning the induction charging device 100 on or off. LEDS 1420 are located near switch 1415 so that the LEDs 1420 can serve as an indicator light for providing status information to a user, such as battery level, and on/off status. In some embodiments, LEDS 1420 are capable of emitting light across the range of the visible light spectrum, including red, orange, yellow, green, blue, indigo and violet and any combinations thereof. PCB 1400 also includes a USB port 1410. In some embodiments, USB port 1410 can be used to recharge the device once battery 1200 has been drained, or as needed to operate the induction charging device.

In some embodiments, when USB port 1410 is used to recharge battery 1200 of the induction charging device, LEDS 1420 light up to indicate current battery levels. In some embodiments, LEDS 1420 light up blue to indicate the battery charging level of battery 1200. In some embodiments, only one or two LEDs are turned on when the battery has low charging level, and all six LEDS are turned on when the battery is fully charged. In some embodiments the number of LEDS 1420 turned on during charging or discharging corresponds to the percentage of battery power available. In some embodiments, when the induction charging device is turned on by switch 1415, at least one LED of LEDS 1420 turn red while the charging device is in the process of detecting a phone or other electronic device placed within charging range of the device. When an electronic device to be charged is detected, at least one LED of LEDS 1420 turns green to indicate charging of the device is taking place. When charging of the electronic device is taking place, at least one of the LEDS 1420 turns blue, and the number of LEDS that light up blue correspond to the charging level of battery 1200.

PCB 1400 has two holes 1435 and 1445 through which cylindrical protrusions 435 and 440 are placed within when PCB 1400 is placed within casing 400. In some embodiments, PCB 1400 is a custom PCB reduced in size by about 8% as compared to off the shelf PCBs of the same type.

Figure 15:
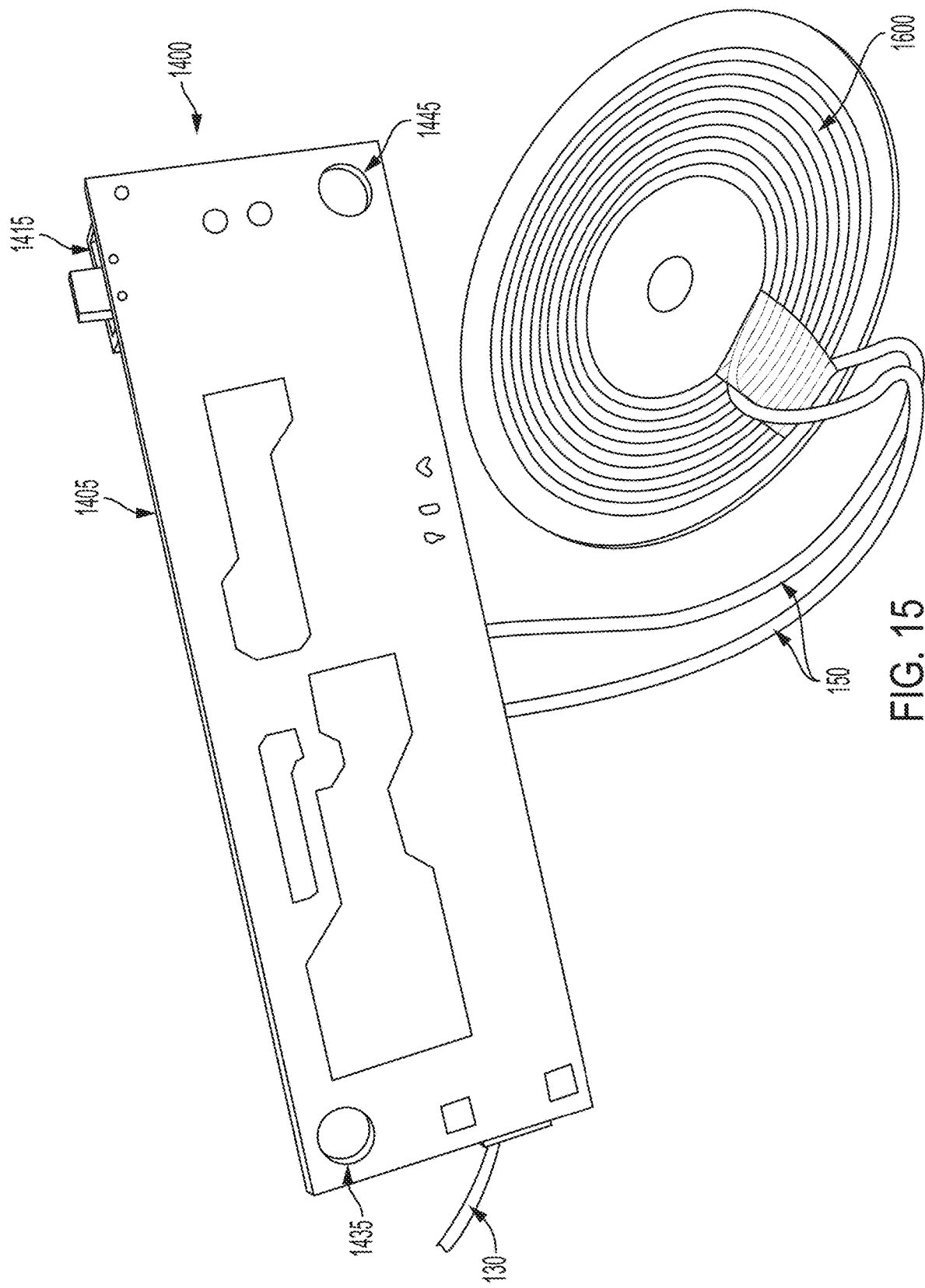
FIG. 15 is a bottom perspective view of the embodiment of the printed circuit board used in the charging device shown in FIG. 14.

FIG. 15 shows the bottom of PCB 1400, along with switch 1415, and connections 150 to transmitter coil 1600.

Figure 16:
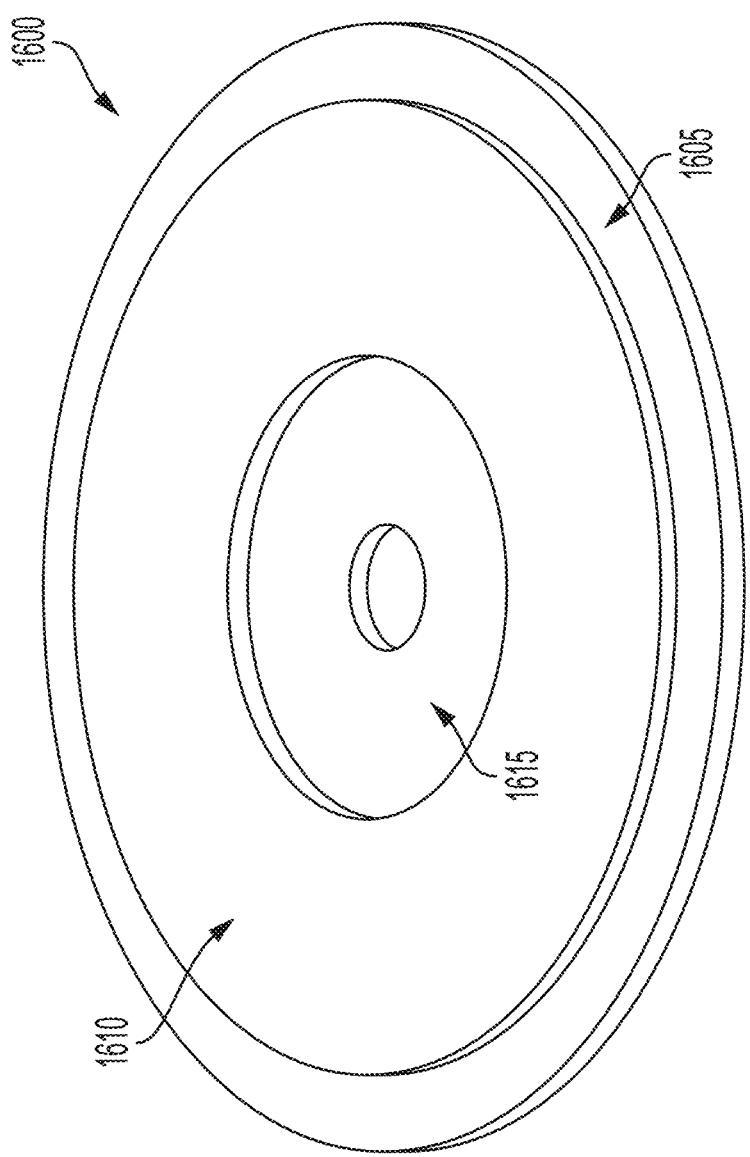
FIG. 16 is a top perspective view of an embodiment of a transmitter coil used in the charging device.

FIG. 16 shows an embodiment of a transmitter coil 1600 used in the charging device 100. Transmitter coil 1600 is composed of wires looped into circular coils 1610, which rest on, and/or are connected or attached to, a circular ferro-magnetic disk 1605. In some embodiments, ferro-magnetic disk 1605 has a central hole. Area 1615 shows an inner part of the disk 1605 not covered by coils 1610. In some embodiments, the looped wire is made of materials such as enameled copper wire, has a diameter of 1 (mm), and has 11 number of turns or loops. The coils are connected to the disk 1605 via an adhesive substance.

Figure 17:
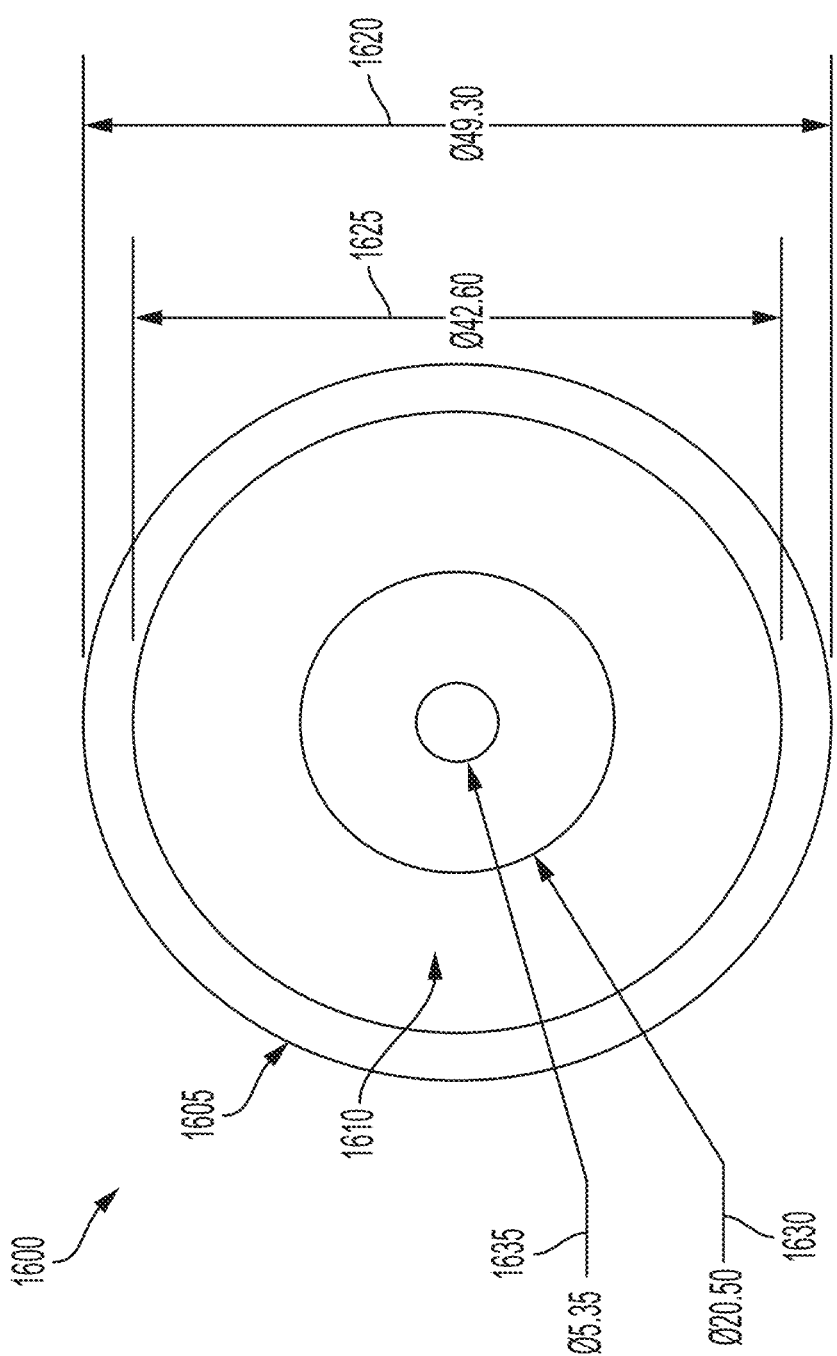
FIG. 17 is a top view of the embodiment of the transmitter coil used in the charging device shown in FIG. 16.

Referring to FIG. 17, measurement 1620 is the diameter of the ferro-magnetic disk 1605. In some embodiments, measurement 1620 is 49.30 (mm). Measurement 1625 is the outer diameter of the coils 1610 and, in some embodiments, measurement 1625 is 42.60 (mm). Measurement 1630 is the inner diameter of the coils 1610 and, in some embodiments, measurement 1630 is 20.50 (mm). Measurement 1635 is the diameter of the circular hole at the center of ferro-magnetic disk 1605. In some embodiments, measurement 1635 is 5.35 (mm).

Figure 18:
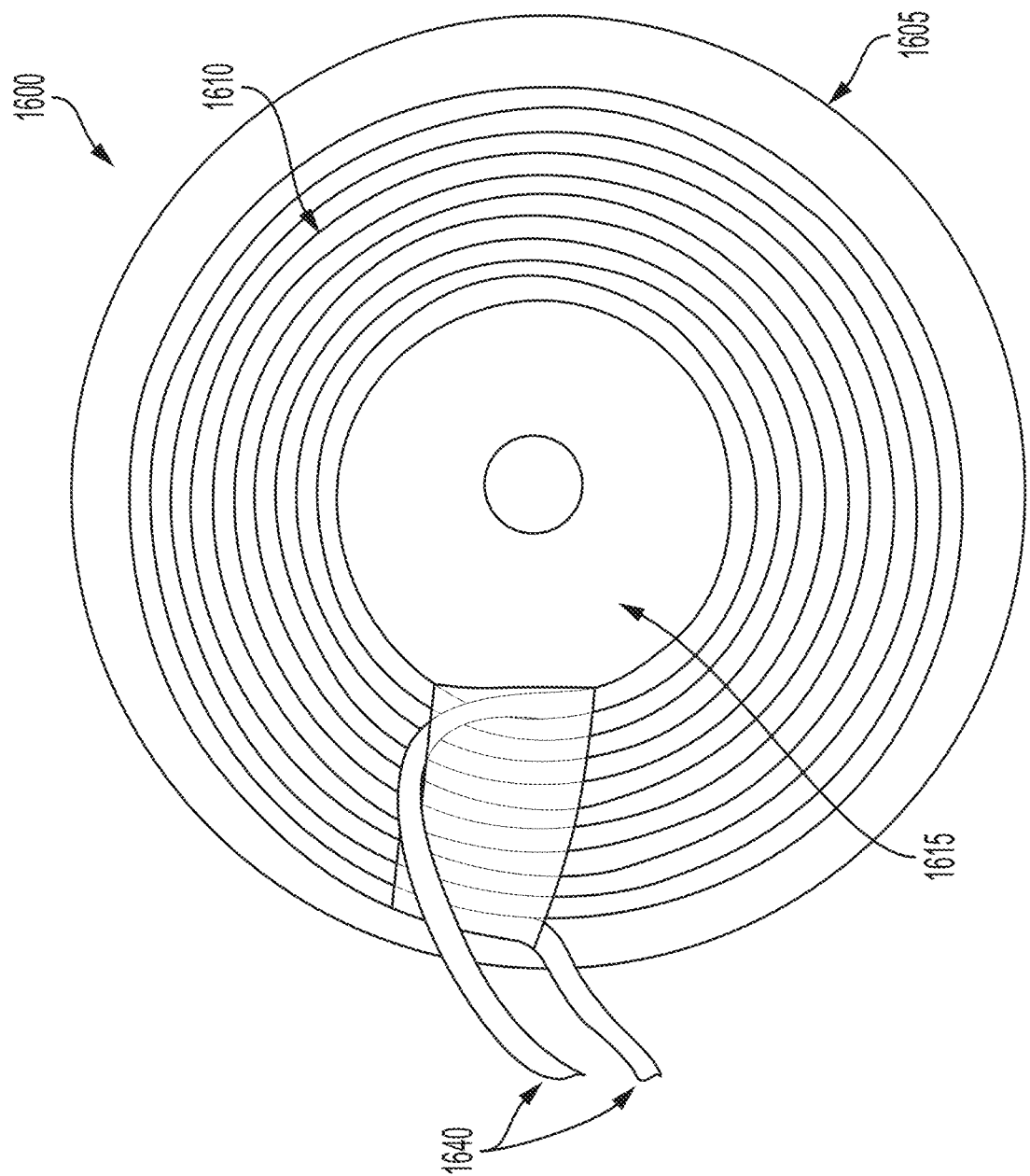
FIG. 18 is a top view of an embodiment of a transmitter coil used in the charging device.

Referring to FIG. 18, transmitter coil 1600 is composed of coils of wire 1610 and a ferro-magnetic disk 1605. Area 1615 shows the inner portion of the disk 1605 not covered by the wire 1610. The wire 1610 has positive and negative ends or first and second ends 1640. A first end of the wire 1640 is coiled in turns and ends in the second end of the wire 1640. In some embodiments, wire 1610 has 10 coils or turns as shown by the transmitter coil 1600 in FIG. 16. In some embodiments, disk 1605 has a circular hole in the center of the disk as shown.

Figure 19:
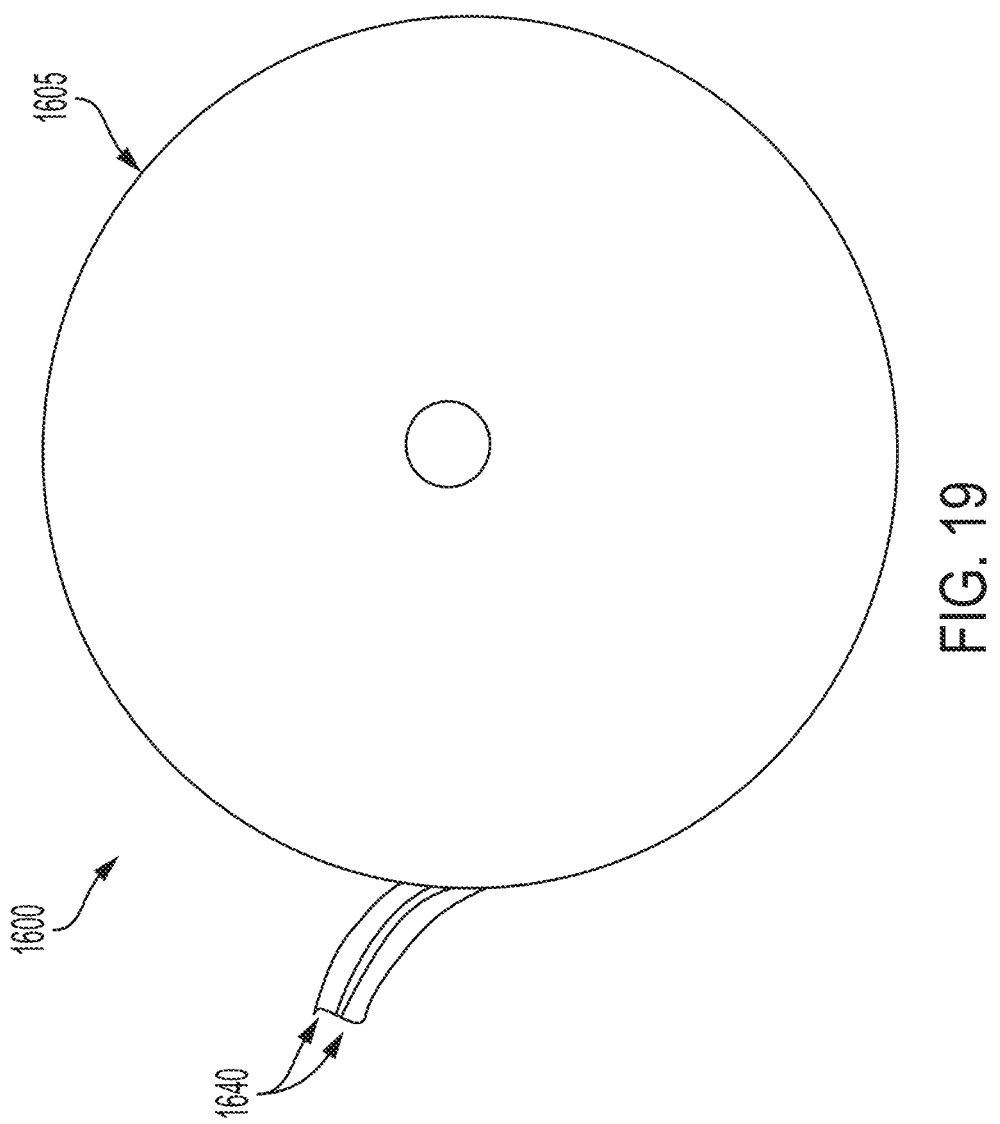
FIG. 19 is a top view of the bottom of the transmitter coil used in the charger device shown in FIG. 18.

FIG. 19 shows the back of transmitter coil 1600 and the back the ferro-magnetic disk 1605 described in FIG. 16.

Figure 20:
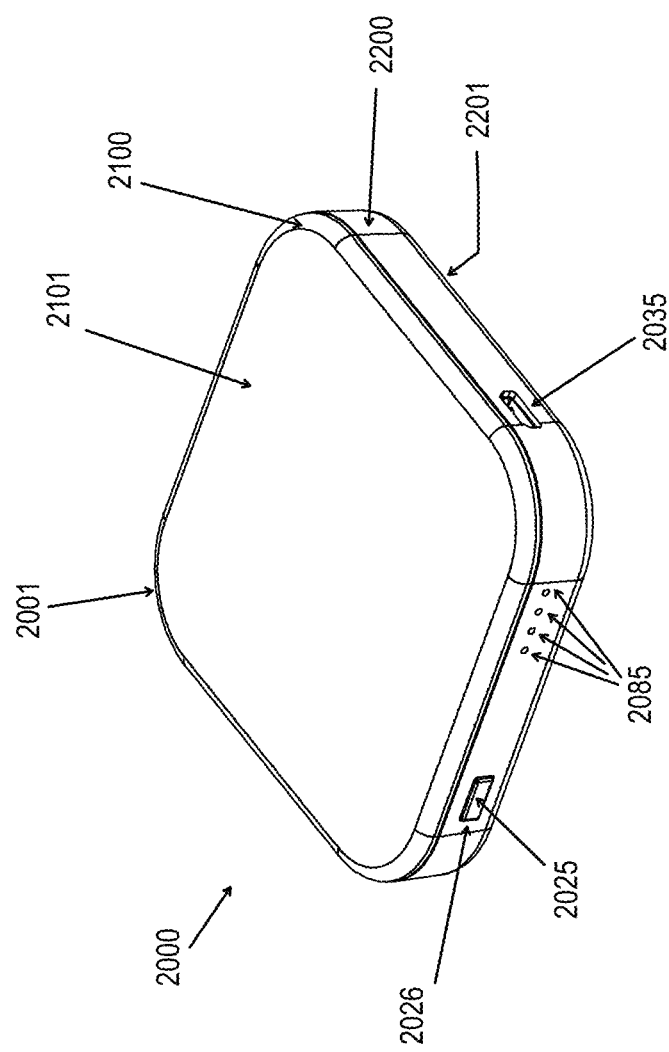
FIG. 20 is a top perspective view of the bottom of a casing assembly of a second embodiment of the charging device of the present disclosure.

FIG. 20 shows a perspective view of a second embodiment of the induction charging device, with a casing assembly 2000 having rounder or curved edges as compared to the first embodiment described above. The PCB 3000 housed in casing assembly 2000 has been altered to better fit in the casing assembly 2000. The second embodiment functions identically to the first embodiment described above with respect to wirelessly charging electronic devices by induction charging.

Casing assembly 2000 is composed of an upper casing portion 2100 and a lower casing portion 2200. The internal components of the induction charging device including the battery 1200, PCB 3000 and coil 1600 fit inside the internal cavity between the upper and lower portions 2100 and 2200 when the casing portions are assembled to create the casing assembly 2000.

In some embodiments casing assembly 2000 is 72 (mm) long and 72 (mm) wide, while being 12.10 (mm) thick. In some embodiments, casing assembly 2000 has curved edges 2001 with a radius of 15 (mm).

Upper casing portion 2100 has a top surface 2101, and bottom casing portion 2200 has a bottom surface 2201.

Bottom casing portion 2200 has four cutouts 2085 for LEDS 3020 located on PCB 3000. In some embodiments, the number of cutouts 2085 match the number of LEDS 3020. In some embodiments, one of the cutouts 2085 is used to view two LEDs 3020 that can light up green and red to indicate the on and off status of the device, and if the induction charging device 100 is properly charging an electronic device. Bottom casing portion 2200 also has a cutout 2035 for USB 3010 and a cutout 2026 for the power switch 3015 both of which are located on PCB 3000. In some embodiments, casing assembly 2000 includes a cover 2025 for protecting power switch 3015 and PCB 3000 from damage, dust and debris. A user can press cover 2025 that can bias inward so that switch 3015 can be pressed to turn on or turn off the induction charging device 100.

Figure 21:
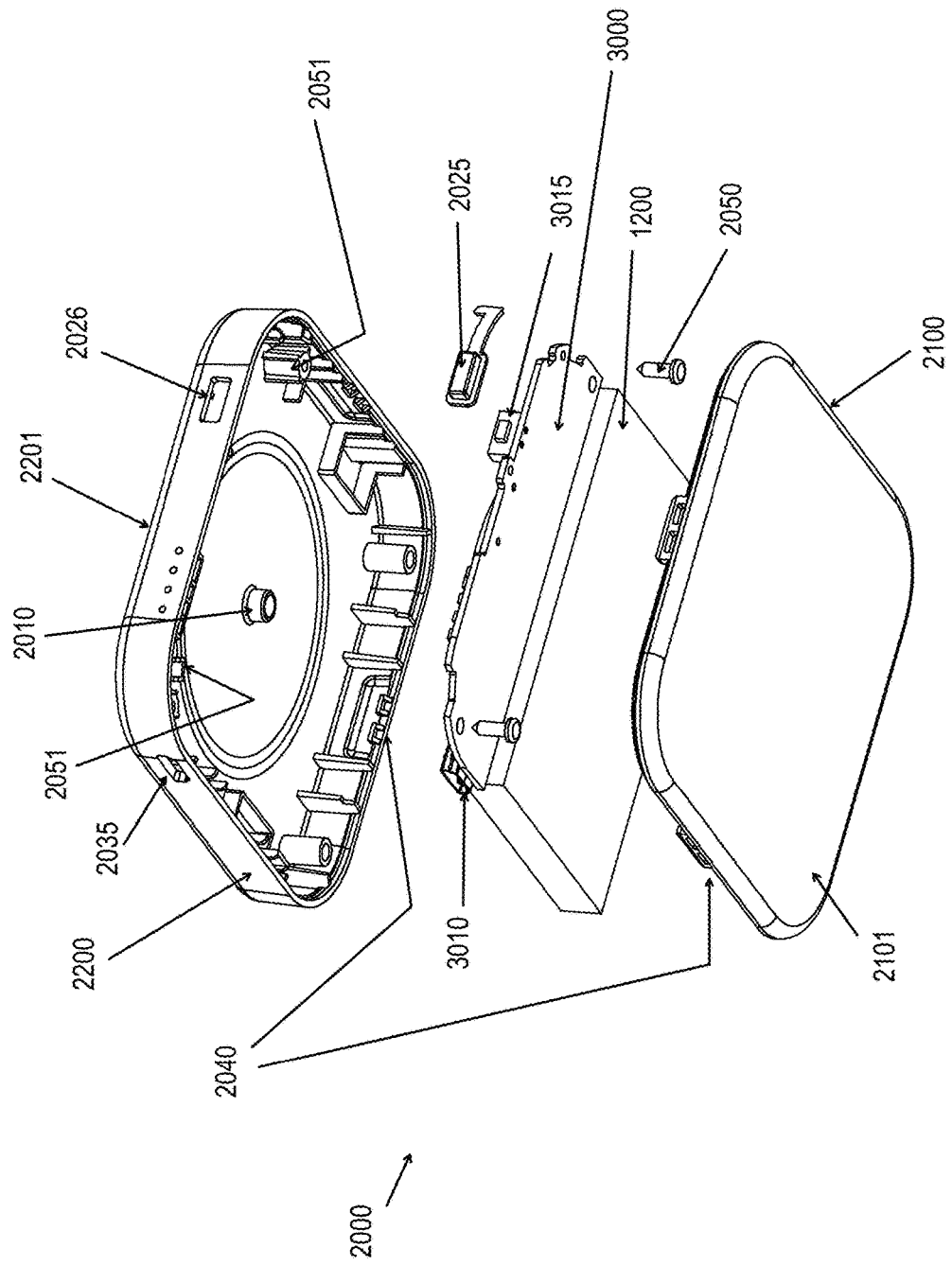
FIG. 21 is an exploded bottom perspective view of the charging device shown in FIG. 20.

Referring to FIG. 21, lower casing portion 2200 has a circular protrusion 2010 that fits within the center hole of ferro-magnetic disk 1605, to keep the coil 1600 in place when the induction charger is fully assembled. Upper and lower casing portions 2100 and 2200 have snap fittings 2040 that interlock when the casing assembly 2000 is assembled to keep the assembly 2000 from separating. Retaining screws 2050 can be used to retain PCB 3000 securely in assembly 2000, by being fitted through holes 3035 and 3045 in PCB 3000 and secured to screw retainers 2051 located on the internal portion of lower casing portion 2200.

Figure 22:
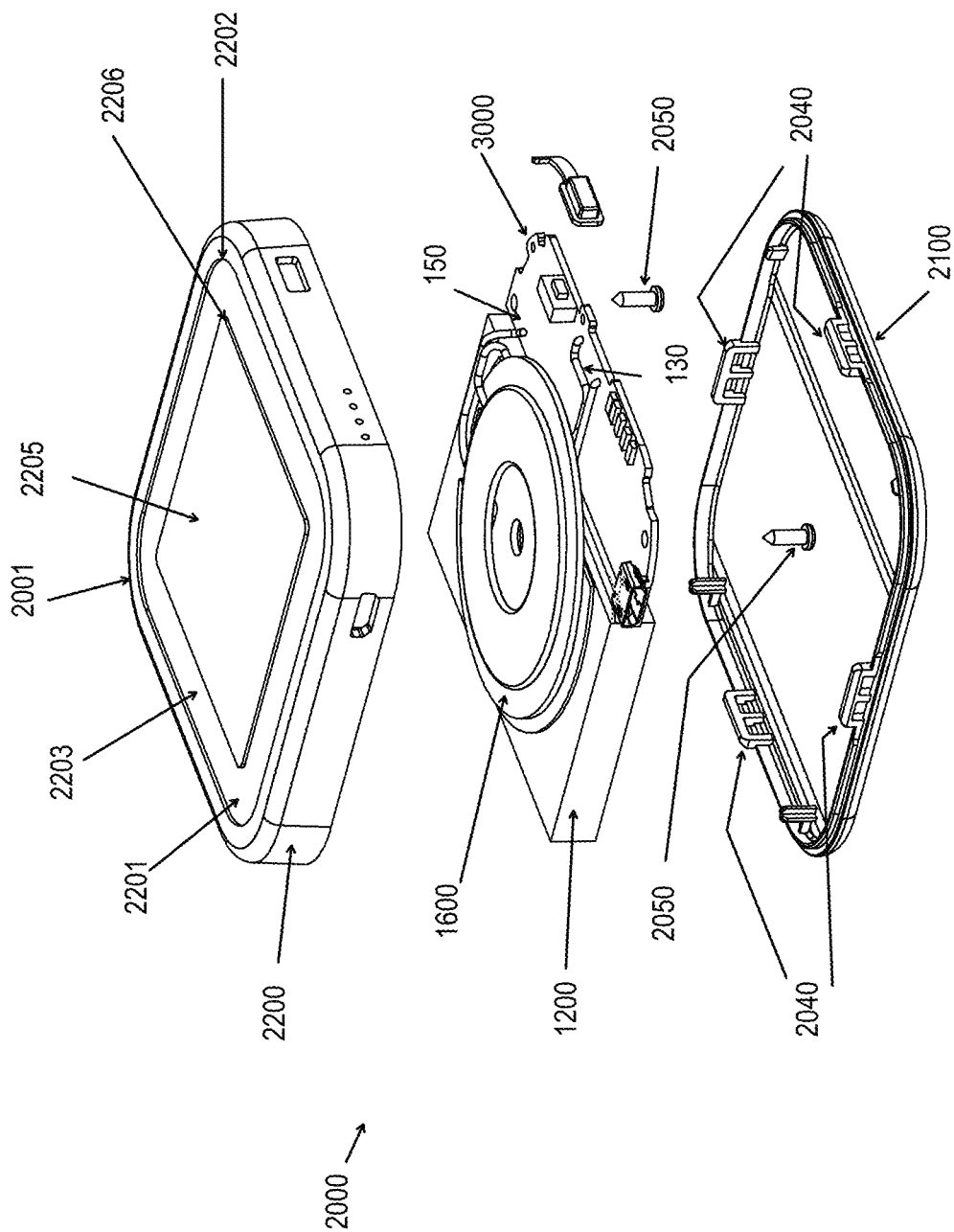
FIG. 22 is an exploded top perspective view of the charging device shown in FIG. 20.
Figure 24:
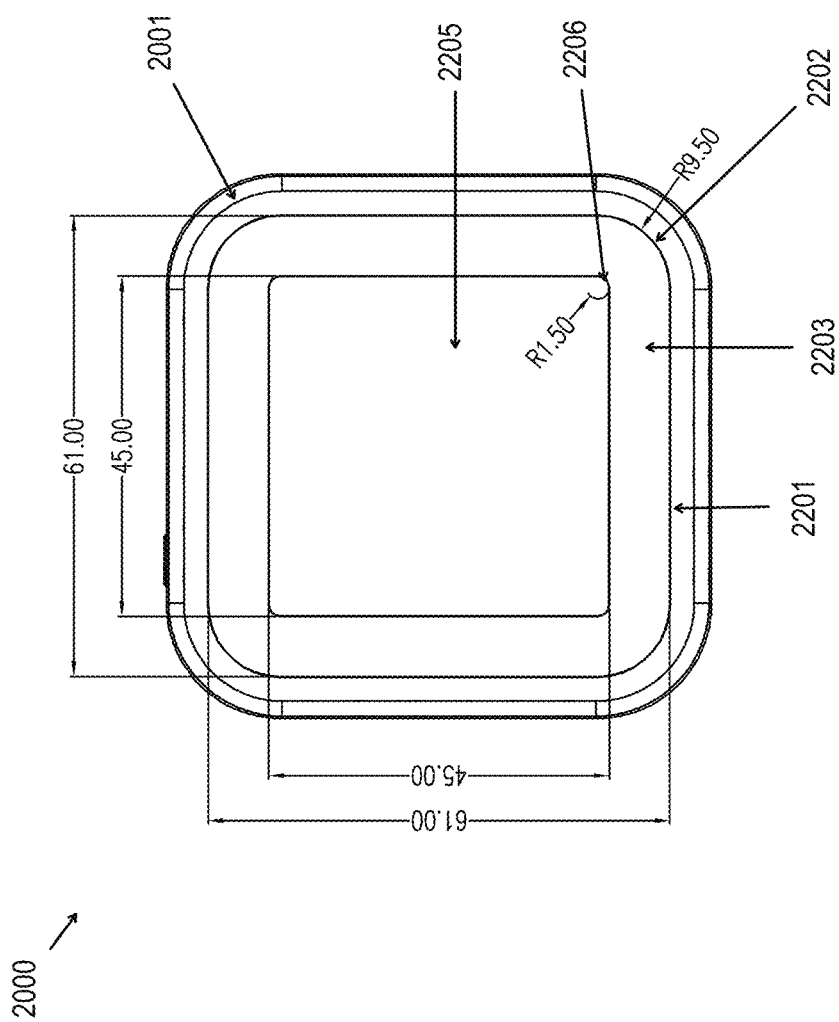
FIG. 24 is a top view of the bottom of the casing assembly as shown in FIG. 20.

Referring to FIGS. 22 and 24, lower casing portion 2200 has an area 2205 on which adhesive is not applied to surface 2201. In some embodiments area 2203 is a squarely shaped outline or perimeter area surrounding area 2205 on which adhesive material 310 is applied on surface 2201. The adhesive material 310 has identical properties to the adhesive described above in FIG. 3 and can be a double-sided micro suction tape. In some embodiments, area 2203 is a depressed perimeter area that is lower than area 2205 so that the adhesive 310 can be better retained on the casing 2200 of the charging device. In some embodiments, area 2205 covers a square area of surface 2201 that is 45 (mm) by 45 (mm). In some embodiments, area 2205 has curved edges 2206 with a radius of 1.5 (mm). In some embodiments, surface 2201 has an area of 61 (mm) by 61 (mm). In some embodiments area 2203 has an area of 61 (mm) by 61 (mm) less the area of area 2205 and has curved edges 2202 with a radius of 9.5 (mm). In some embodiments area 2203 has an area of adhesive 310 applied that is at or between 1,550 (mm$^2$) to 1,750 (mm$^2$). In some embodiments area 2203 has an area of adhesive applied that is 1,680 (mm$^2$). Advantageously the amount of adhesive applied to area 2203 is enough to prevent relative motion between the charging device 100 and the electronic device to be charged when the electronic device is placed on the adhesive, while still allowing a user to remove the electronic device from the charging device 100 without significant effort.

The internal components of casing assembly 2000, including battery 1200, PCB 3000, coil 1600 are connected as described above. Connections 150 and 130 from between the coil 1600 and battery 1200 to the PCB 3000 are shown in FIG. 22.

Figure 23:
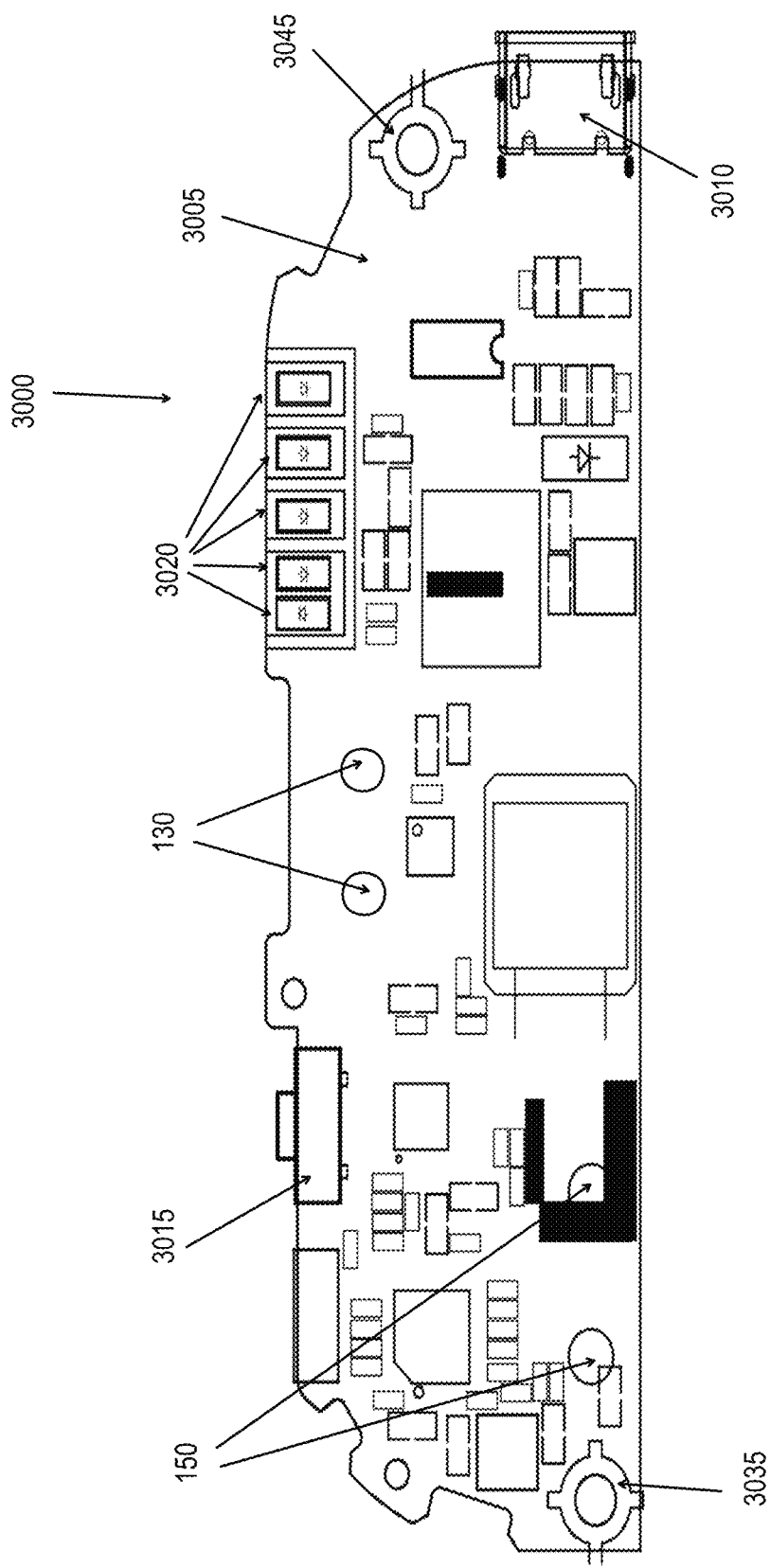
FIG. 23 is a top view of the printed circuit board shown in FIG. 21.

Referring to FIG. 23, PCB 3000 is shown having an altered shape suitable for use in casing 2000. PCB 3000 has an electronic circuit board 3005. Electronic circuit board 3005 includes components such as capacitors, diodes, inductors, resistors, LEDS, and power regulating circuitry configured to operate the induction charging device 100. PCB 3000 includes DC to DC step up converter 120 and DC to AC convertor 140. PCB 3000 has a switch 3015 for turning the induction charging device 100 on or off. Five LEDS 3020 are located near switch 3015 so that the LEDs 3020 can serve as an indicator light for providing status information to a user, such as battery level, if the device 100 is functioning properly, and on/off status. In some embodiments, LEDS 3020 are capable of emitting light across the range of the visible light spectrum, including red, orange, yellow, green, blue, indigo and violet and any combinations thereof.

PCB 3000 also includes a USB port 3010. In some embodiments, USB port 3010 is used to recharge the device once battery 1200 has been drained, or as needed to operate the induction charging device.

In some embodiments, when USB port 3010 is used to recharge battery 1200 of the induction charging device, LEDS 3020 light up to indicate current battery levels. In some embodiments, LEDS 3020 light up blue to indicate the battery charging level of battery 1200. USB port 3010 can be connected to a charging cord capable of being plugged into a power supply to provide power to recharge the battery.

In some embodiments, regardless if the battery 1200 is discharging to charge an electronic device, or if the battery 1200 is being recharged through the USB port 3010, only one blue LED is turned on when the battery level is at or between 0-33%, two blue LEDS are turned on when the battery level is at or between 34-66%, and three blue LEDs are turned on when the battery level is at or between 67-100%. In some embodiments, when the induction charging device is turned on by switch 3015, at least one LED of LEDS 3020 turn red while the induction charging device 100 is in the process of detecting a phone or other electronic device placed within charging range of the device. When an electronic device to be charged is detected, at least one LED of LEDS 3020 turns green to indicate charging of the device is taking place.

The dimensions provided herein can be +/−2% of the given amount.

It is envisioned that an embodiment of the induction charging device of the present disclosure comprises: a casing including a top portion and a bottom portion, a printed circuit board, a battery, and an induction transmitter coil. The printed circuit board, battery and induction transmitter coil are housed internally between the top portion and the bottom portion of the casing. Also, the casing has an adhesive portion in an external area of the casing closest to the transmitter coil.

It should also be noted that the terms "first", "second", "third", "upper", "lower", and the like can be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes can be made and equivalents can be substituted for elements thereof without departing from the scope of the present disclosure. In addition, many modifications can be made to adapt a particular situation or material to the teachings of the disclosure without departing from the scope thereof. Therefore, it is intended that the present disclosure is not limited to the particular embodiment(s) disclosed as the best mode contemplated.

What is claimed is:
1. An induction charging device comprising:
  an upper casing portion and a lower casing portion connected together to form a casing assembly with an internal cavity;

a printed circuit board having a power switch, a direct current to direct current step up convertor, a direct current to alternating current converter and a plurality of light emitting diodes;

a battery, wherein the battery is connected by circuit wiring to the direct current to direct current step up convertor; and a transmitter coil having a first side and a second side with the first side being adjacent to a ferromagnetic disk and the second side being adjacent to an inner surface of the lower casing portion;

wherein the printed circuit board, battery, transmitter coil and ferromagnetic disk are housed in the internal cavity;

wherein the direct current to direct current step up convertor is connected by circuit wiring to the direct current to alternating current converter;

wherein the direct current to alternating current converter is connected by circuit wiring to the transmitter coil;

wherein the lower casing portion has an external surface on which an adhesive is applied; and wherein the casing assembly has a plurality of cutouts for external viewing of the plurality of light emitting diodes and accessing the power switch.

2. The induction charging device of claim 1, wherein the printed circuit board further comprises a universal serial bus connector, and wherein the casing assembly has a further cutout for accessing the universal serial bus connector.

3. The induction charging device of claim 1, wherein the battery is a lithium ion polymer battery.

4. The induction charging device of claim 3, wherein the battery has a capacity of 2000 mAH.

5. The induction charging device of claim 1, wherein the direct current to direct current step up convertor receives a voltage in a range of 3.0-4.2 volts from the battery and steps up the voltage to 5.0 volts.

6. The induction charging device of claim 1, wherein the direct current to alternating current converter provides the transmitter coil with an AC current with a frequency of between 100 kHZ and 215 kHZ.

7. The induction charging device of claim 1, wherein the adhesive is a double sided micro suction tape.

8. The induction charging device of claim 1, wherein the adhesive is a double sided micro suction tape having a square shaped outline with an area of between 1,550 ($mm^2$) to 1,750 ($mm^2$).

9. The induction charging device of claim 1, wherein the adhesive is a circularly shaped outline with an area of between 1,250 ($mm^2$) to 1,450 ($mm^2$).

10. The induction charging device of claim 1, wherein the transmitter coil further comprises a looped wire.

11. The induction charging device of claim 10, wherein the looped wire has a diameter of 1.10 mm and is an enameled copper wire.

12. The induction charging device of claim 1, wherein the plurality of light emitting diodes consist of five light emitting diodes.

13. The induction charging device of claim 12, wherein one of the five light emitting diodes lights up to indicate a battery level in a range at or between 0-33%.

14. The induction charging device of claim 12, wherein two of the five light emitting diodes light up to indicate a battery level in a range at or between 34-66%.

15. The induction charging device of claim 12, wherein three of the five light emitting diodes light up to indicate a battery level in a range at or between 67-100%.

16. The induction charging device of claim 12, wherein one of the five light emitting diodes lights up green to indicate that the induction charging device has been powered on and that charging on an electronic device is properly proceeding.

17. The induction charging device of claim 12, wherein one of the five light emitting diodes lights up red to indicate that the induction charging device has been powered on and that charging on an electronic device is not properly proceeding.

18. The induction charging device of claim 1, wherein the battery provides 3.7 volts.

19. A method of using the induction charging device of claim 1, the method comprising the steps of:
turning on the induction charging device by pressing the power switch; and preventing relative motion between the induction charging device and an electronic device enabled for wireless induction charging by placing the electronic device onto the adhesive so that the electronic device is able to charge.

20. A method of using the induction charging device of claim 1, the method comprising the steps of:
plugging a charging cord into the universal serial bus connector to recharge the battery.

* * * * *